US010825010B2

(12) United States Patent
Olmstead et al.

(10) Patent No.: US 10,825,010 B2
(45) Date of Patent: Nov. 3, 2020

(54) SELF-CHECKOUT WITH THREE DIMENSIONAL SCANNING

(71) Applicant: Datalogic USA, Inc., Eugene, OR (US)

(72) Inventors: Bryan Olmstead, Eugene, OR (US);
Ken McCormack, Albany, OR (US);
WenLiang Gao, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 264 days.

(21) Appl. No.: 15/848,436

(22) Filed: Dec. 20, 2017

(65) Prior Publication Data

US 2018/0189763 A1   Jul. 5, 2018

Related U.S. Application Data

(60) Provisional application No. 62/440,923, filed on Dec. 30, 2016.

(51) Int. Cl.
*G06Q 20/20* (2012.01)
*G06Q 20/18* (2012.01)
(Continued)

(52) U.S. Cl.
CPC ......... *G06Q 20/208* (2013.01); *G06K 9/3208* (2013.01); *G06K 9/52* (2013.01); *G06Q 20/18* (2013.01); *G07G 1/0063* (2013.01)

(58) Field of Classification Search
CPC .... G06Q 20/208; G06Q 20/18; G06K 9/3208; G06K 9/52; G07G 1/0063
See application file for complete search history.

(56) References Cited

U.S. PATENT DOCUMENTS 5,430,480 A   7/1995   Allen et al.
6,215,519 B1   4/2001   Nayar et al.
(Continued)

FOREIGN PATENT DOCUMENTS

EP   0 878 965 A2   11/1998
EP   0878965 A2 *  11/1998  ....... G08B 13/19608
(Continued)

OTHER PUBLICATIONS https://web.archive.org/web/20160208111143/https://en.wikipedia.org/wiki/Rolling_shutter (Year: 2016).*

(Continued)

*Primary Examiner* — A. Hunter Wilder
*Assistant Examiner* — Joseph M Mutschler
(74) *Attorney, Agent, or Firm* — Cozen O'Connor

(57) ABSTRACT

Systems and methods for providing self-checkout systems that utilize a scanning imager or camera which includes a selectively steerable field of view. A tracking subsystem may include a targeting imager or camera that captures data (e.g., 3-dimensional data) that characterizes objects in an environment, for instance a retail environment. Images captured by one or more targeting imagers may be used to determine characteristics of objects. The characteristics may be used to generate an object model, which is a collection of properties about an object in the field of view. The tracking subsystem directs the field of view of the relatively higher resolution scanning imager with a relatively narrow field of view to track one or more objects so that images of the objects may be captured. The images are processed to identify the identification of the objects so that the objects may be added to a transaction list to complete a purchase process.

24 Claims, 18 Drawing Sheets

(51) Int. Cl.
  G07G 1/00 (2006.01)
  G06K 9/32 (2006.01)
  G06K 9/52 (2006.01)

(56) References Cited

U.S. PATENT DOCUMENTS

| | | | |
|---|---|---|---|
| 6,215,915 B1 * | 4/2001 | Reyzin | G06T 3/00 345/648 |
| 6,590,695 B1 | 7/2003 | Kurtz et al. | |
| 7,973,834 B2 | 7/2011 | Yang | |
| 7,983,565 B2 | 7/2011 | Varshneya et al. | |
| 8,072,482 B2 | 12/2011 | Gibbs et al. | |
| 8,203,702 B1 | 6/2012 | Kane et al. | |
| 8,289,392 B2 | 10/2012 | Senior et al. | |
| 8,681,260 B2 | 3/2014 | Bush | |
| 9,071,742 B2 | 6/2015 | Birkbeck et al. | |
| 9,851,563 B2 | 12/2017 | Gao et al. | |
| 2006/0056056 A1 | 3/2006 | Ahiska et al. | |
| 2008/0042042 A1 | 2/2008 | King et al. | |
| 2008/0117296 A1 | 5/2008 | Egnal et al. | |
| 2011/0063446 A1 | 3/2011 | McMordie et al. | |
| 2011/0292406 A1 | 12/2011 | Hollenbeck et al. | |
| 2012/0307084 A1 | 12/2012 | Mantzel et al. | |
| 2013/0021474 A1 | 1/2013 | Taylor et al. | |
| 2014/0029796 A1 | 1/2014 | Fiorini et al. | |
| 2015/0012396 A1 | 1/2015 | Puerini et al. | |
| 2015/0029339 A1 | 1/2015 | Kobres et al. | |
| 2015/0085150 A1 | 3/2015 | Silverstein | |
| 2015/0122890 A1 | 5/2015 | Olmstead et al. | |

FOREIGN PATENT DOCUMENTS

| | | | | |
|---|---|---|---|---|
| EP | 3 098 751 A1 | | 11/2016 | |
| EP | 3098751 A1 | * | 11/2016 | ............... G06T 7/13 |
| GB | 2537405 A | * | 10/2016 | ........... G07G 1/0063 |
| GB | 2537405 A | | 10/2016 | |
| WO | 2013/152205 A1 | | 10/2013 | |
| WO | WO-2013152205 A1 | * | 10/2013 | ......... G02B 27/0172 |

OTHER PUBLICATIONS

Almeida et al., "Real-Time Tracking of Moving Objects Using Particle Filters," *Proceedings of the IEEE International Symposium on Industrial Electronics*:1327-1332, 2005.
International Search Report and Written Opinion of the International Searching Authority, dated Sep. 2, 2017, for International Application No. PCT/US2016/053555, 22 pages.
Olmstead et al., "Imaging Systems, Methods and Articles With Field-Of-View Tracking," U.S. Appl. No. 62/222,595, filed Sep. 23, 2015, 60 pages.
Wikipedia, "Rolling Shutter," downloaded from https://en.wikipedia.org/w/index/php?title=Rolling_shutter&oldid=642645523 on Dec. 7, 2016, 4 pages.
International Search Report and Written Opinion, dated Mar. 2, 2018, for International Application No. PCT/US2017/067565, 21 pages.
Olmstead et al., "Imaging Systems and Methods for Tracking Objects," U.S. Appl. No. 15/762,997, filed Mar. 23, 2018, 60 pages.
Preliminary Amendment, filed Mar. 23, 2018, for U.S. Appl. No. 15/762,997, Olmstead et al., "Imaging Systems and Methods for Tracking Objects," 8 pages.
Office Action dated May 16, 2019, issued in corresponding U.S. Appl. No. 15/762,997, filed Mar. 23, 2018, 15 pages.

\* cited by examiner

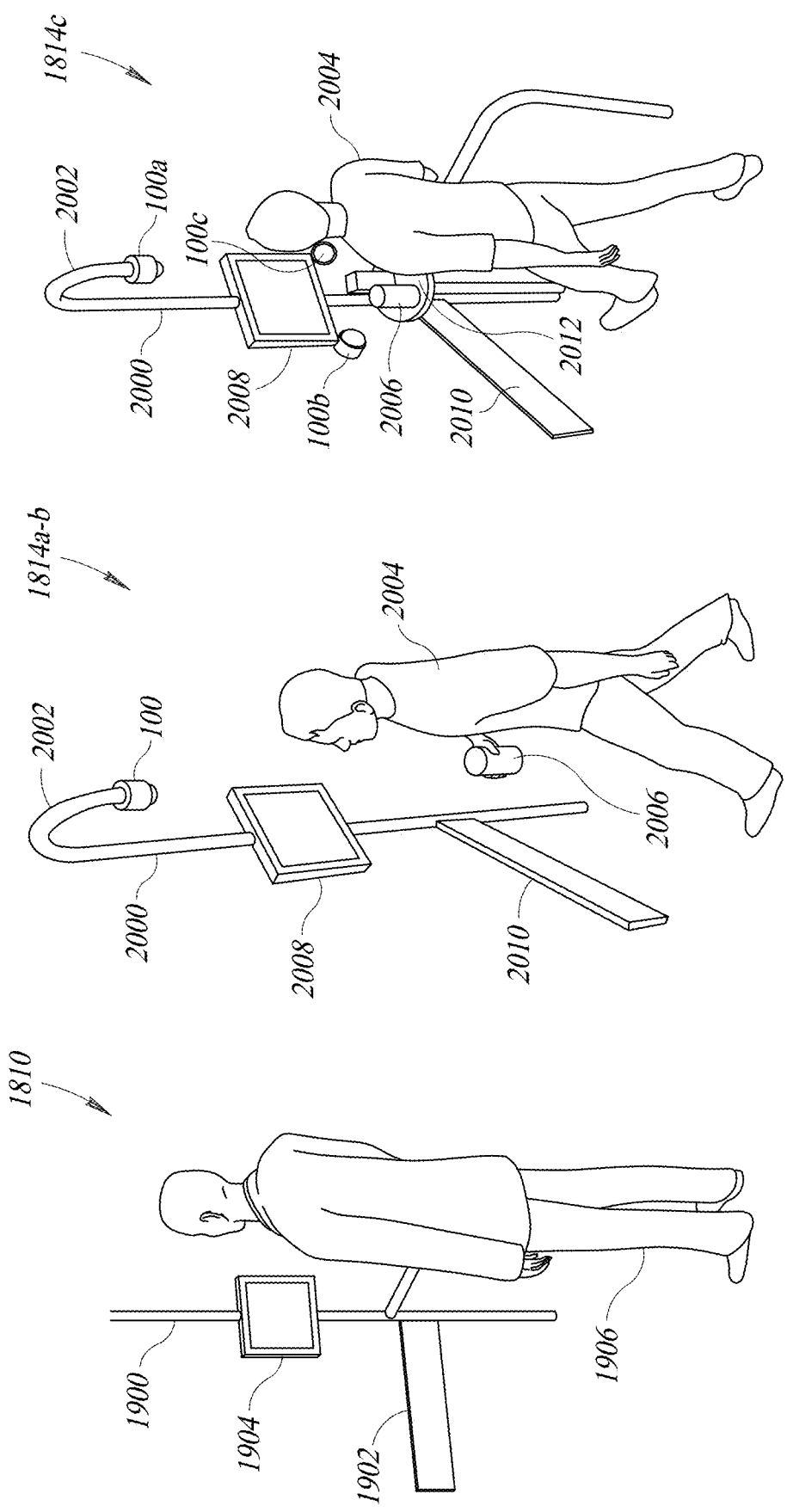

SELF-CHECKOUT WITH THREE DIMENSIONAL SCANNING

BACKGROUND

Technical Field

The present disclosure relates to imager based systems, for example image-based systems that automatically detect, monitor and track objects in an environment, for instance in a retail store.

Description of the Related Art

Many applications would benefit by automated detection, monitoring or tracking of objects in the respective environment. For example, retail, warehouse, baggage sorting, parcel sorting, or gaming casino environments may benefit by automated detection, monitoring or tracking of objects using image-based techniques.

In many applications or environments, objects to be monitored or tracked are moving or in transit. For example, a retail environment (e.g., grocery or convenience store) may employ ceiling mounted cameras used for detection of items in shopping carts. Such cameras must be capable of capturing relatively high-resolution images in order to discern the specific objects or items. In particular, machine vision algorithms require a certain number of pixels in order to properly identify objects or items. Thus, when a large area is to be covered, a camera or imager mounted in a ceiling would have to have a very high resolution. As an estimate, in order to recognize items as small as 5 inches by 5 inches in size (e.g., a box of Tide® laundry detergent), an image would require approximately 200 pixels by 200 pixels. At approximately 40 pixels per inch, a 5 Megapixel imager could only cover an area of about 5 feet by 4 feet while still providing sufficient resolution to identify objects or items. For example, if the application is monitoring or tracking objects or items at a checkout station or counter of, for instance a grocery store (e.g., on a conveyor belt at the checkout station or counter, and/or in the shopping cart), this area of coverage is not sufficient. In particular, a position of a shopping cart at a checkout station or counter can vary substantially from one checkout transaction to another, or even during a single checkout transaction, making selection of an appropriate 5 foot by 4 foot area for imaging virtually impossible.

Further, sharp image capture is needed for successfully reading linear or one-dimensional machine-readable symbols (e.g., barcode symbols) and/or two-dimensional machine-readable symbols (e.g., area or matrix code symbols, watermarks). For moving objects, sharp image capture typically requires very fast shutter speeds, which can be impossible using ambient light, leading to the need for expensive and large active illumination systems. Active illumination can interfere with other opto-electronic components of a system or device, and may present an annoyance to human operators.

BRIEF SUMMARY

In at least one implementation, a field of view of a scanning imager or camera is directed or caused to track one or more objects via a steering mirror, for instance a fast steering mirror. A tracking subsystem may include a targeting imager or camera, or some other sensor(s) or transducer(s) that capture data (e.g., 3-dimensional data) that characterizes objects in an environment, for instance a retail environment. In other implementations, images captured by one or more targeting imagers may be used to determine characteristics of objects, which characteristics are used to cause a respective field of view of a scanning imager to track one or more objects. Characteristics may, for example, include distance, dimensions, rotation, images of the object, bounding boxes, scan state, appearance, presence, location, position, speed, and/or direction of travel of the object. Characteristics may also, for example, include physical characteristics of the object and/or packaging, which characteristics allow classifying the object as a certain type of object (e.g., stock keeping unit or SKU, restricted sale type item). The characteristics may be used to generate an object model, which is a collection of properties about an object in the field of view. The steering mirror directs the field of view of the relatively higher resolution scanning imager with a relatively narrow field of view to track an object, for example an object spotted in a wider field of view of one or more targeting imagers, and/or an object that is in motion. For moving objects, relative motion between the object and the field of view of the higher resolution imager is reduced or eliminated.

The imaging system may be employed in self-checkout systems and/or in loss prevention system, for example in retail environments. For example, two imagers may be employed to cover an area (e.g., checkout station or counter, aisle, game pit), a targeting imager having a relatively wider field of view and a scanning imager having a relatively narrower field of view which is steerable by a steering component. For instance, the relatively narrower field of view may be steerable via a steering mirror. The type of steering mirror, and in particular the speed at which the steering mirror can operate, may be a function of the specific application. The steering mirror may include the Eagle Eye™ fast steering mirror, developed by DataLogic, for example.

This approach can be employed, for example, to advantageously detect objects or items in a shopping cart, shopping basket, a customer's hands, or elsewhere at a checkout station or counter. Detected objects or items may be identified and added to a transaction list to implement a transaction process. Further, this approach can be employed, for example, to recognize individuals (e.g., customers). This approach can be employed, for example, to advantageously monitor shopping at a checkout station or counter of a retail environment, or at other locations. For example, this approach can be employed, for example, to monitor or track the selection of items or objects from shelves and placement into a shopping cart or shopping basket in aisles of a retail environment, allowing better assessment of shopping patterns or purchasing decisions or, conversely, detection of shoplifting.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 19 is a pictorial view of a turnstile system of the store of FIG. 18, according to one illustrated implementation.

FIG. 20A is a pictorial view of a self-checkout system of the store of FIG. 18, according to one illustrated implementation.

FIG. 20B is a pictorial view of a self-checkout system of the store of FIG. 18 that includes a shelf, according to one illustrated implementation.

DETAILED DESCRIPTION

Figure 1:
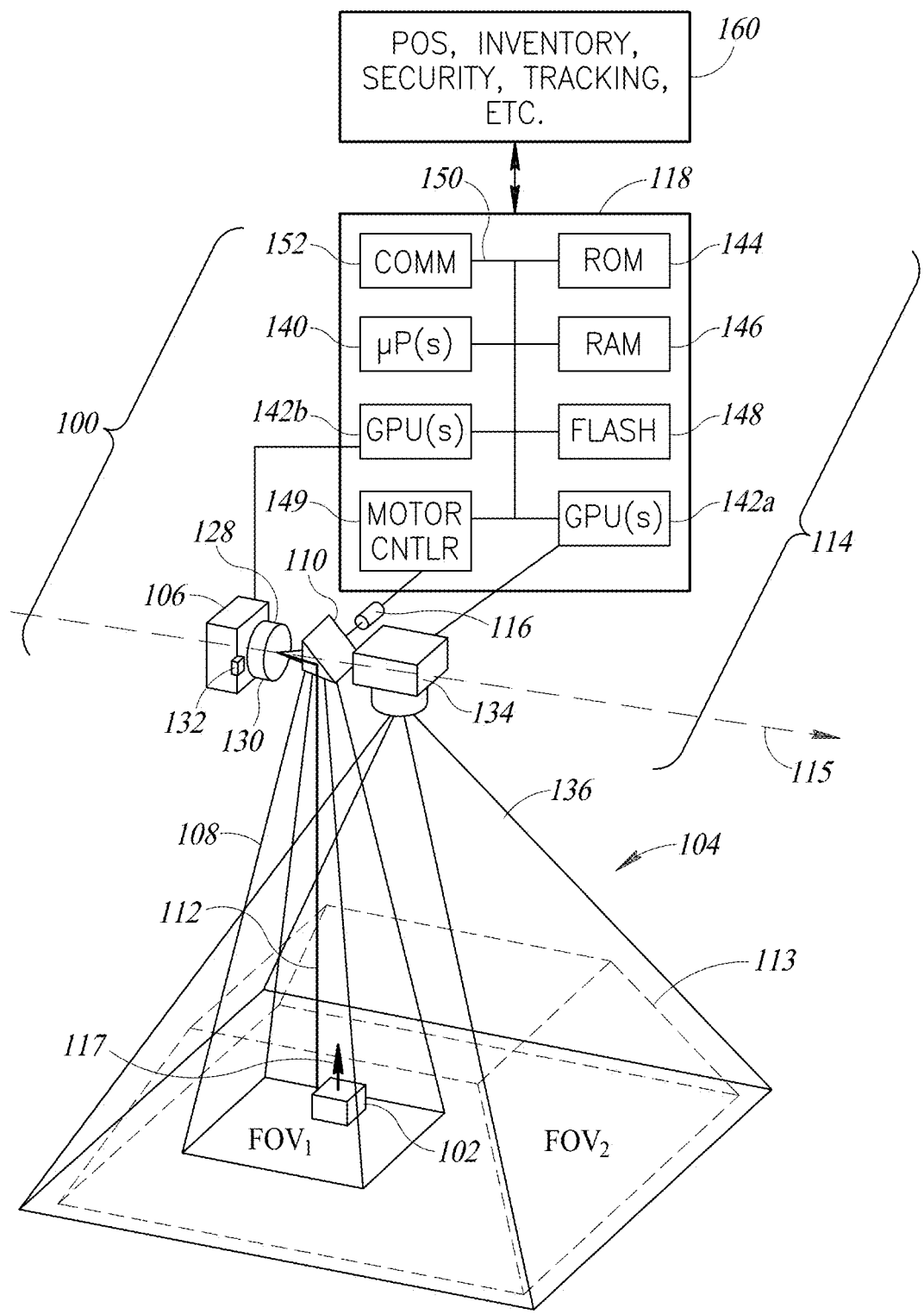
FIG. 1 is a schematic view of an imaging system, according to at least one illustrated implementation, which may be employed in tracking and/or monitoring objects in an environment, for example a retail environment, the imaging system including a scanning imager and a targeting imager with a wider field of view than that of the scanning imager, and an object tracking subsystem to cause the field of view of the scanning imager to track an object in the environment based on information from the targeting imager.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure provide an imaging system which produces high resolution images of objects in a scanning volume at relatively large distances in a large field of view and at relatively low cost. The imaging system works on the principle that the entire field of view does not need to be captured at the highest resolution or at an exact moment in time. Rather, the imaging system may select only objects that are of interest in the field of view and provide high resolution images for the selected objects.

In at least some implementations, the imaging system includes at least one scanning imager and at least one targeting imager. Generally, the scanning imager has a relatively narrow field of view and produces high resolution images. The scanning imager is operatively coupled to a steering component (e.g., articulating mirror system) which is capable of changing the pointing vector of the field of view of the scanning imager at a high rate (e.g., every frame). The scanning imager may also include a variable focus system capable of changing focus depth rapidly (e.g., each frame). The scanning imager may also include an exposure synchronization system to link targeting frames produced by the targeting imager with scanning frames produced by the scanning imager.

The targeting imager may produce wide angle, high resolution images. In at least some implementations, the targeting imager produces a depth map wherein each pixel represents the distance of objects with the target imager field of view with respect to a baseline position, which is a common reference point for the imagers. As discussed further below, information obtained by the targeting imager may be used to control the scanning imager to capture images of selected objects.

In at least some implementations, an imaging system may include more than one scanning imager and/or more than one targeting imager. For example, in some applications it may be desirable to include multiple scanning imagers associated with one targeting imager, or vice versa. The systems and methods disclosed herein may be applied to any combination and quantity of scanning imagers and targeting imagers in an imaging system. Further, in at least some implementations, the scanning imager(s) and targeting imager(s) of an imaging system may not be co-located.

FIG. 1 shows an imaging system 100, according to at least one illustrated implementation. The imaging system 100 may be employed in tracking and/or monitoring objects 102 (only one shown in FIG. 1) in an environment 104, for instance objects in a retail environment (e.g., self-checkout system).

The imaging system 100 includes a scanning imager 106 having a scanning imager field of view 108 to capture images of the environment 104. The imaging system 100 includes a steering mirror 110 interposed along a first optical path, represented by line 112, between the scanning imager 106 and the environment 104. The steering mirror 110 is selectively operable to steer at least a portion of the scanning imager field of view 108 relative to one or more objects 102 in the environment 104.

The imaging system 100 includes an object tracking subsystem 114 that includes one or more hardware processors. The object tracking subsystem 114 is communicatively coupled to cause the steering mirror 110 to steer the scanning imager field of view 108 based at least in part on information indicative of at least one characteristic or object model of at least one object 102 in the environment 104 to at least partially track objects 102 in the environment 104. For example, the object tracking subsystem 114 is communicatively coupled to provide control signals to a steering mirror actuator 116 to cause the steering mirror actuator to move the steering mirror 110 to move the scanning imager field of view 108 of the scanning imager 106.

The steering mirror actuator 116 is drivingly coupled to the steering mirror 110 and responsive to signals from a control subsystem 118 to steer the scanning imager field of view 108. The steering mirror actuator 116 may take any of a large variety of forms. For example, the steering mirror actuator 116 may take the form of one or more electric motors, for instance a stepper motor. Also for example, the steering mirror actuator 116 may take the form of one or more solenoids. Also for example, the steering mirror actuator 116 may take the form of one or more piezoelectric crystals or elements. Also for example, the steering mirror actuator 116 may take the form of one or more electromagnetic and magnetic elements (e.g., magnet, ferrous metal). The fast steering mirror 110 may, for example, take the form of the Eagle Eye™ fast steering mirror, developed by DataLogic.

The steering mirror 110 may pivot about one or more pivot axes to selectively move the scanning imager field of view 108. The steering mirror actuator 116 may be responsive to signals from the control subsystem 118 to concurrently steer the field of view 108 of the scanning imager 106. For example, the control subsystem 118 may cause the steering mirror actuator 116 to move the steering mirror 110 to an initial scan position, then to immediately follow a shutter exposure by panning the field of view 108 of the scanning imager 106 to a different scan position for the next frame.

The scanning imager 106 may optionally include a variable focus lens 128 in the first optical path 112 between the scanning imager 106 and the environment 104. Additionally or alternatively, the scanning imager 106 may optionally include a polarizer 130 in the first optical path 112 between the scanning imager 106 and the environment 104. Additionally or alternatively, the scanning imager 106 or the imaging system 100 may optionally include an illumination source 132 positioned and oriented to illuminate at least a portion of the environment 104 in the scanning imager field of view 108.

In the implementation illustrated in FIG. 1, the object tracking subsystem 114 includes a targeting imager 134 having a targeting imager field of view 136 to capture images of the environment 104. Notably, the scanning imager field of view 108 is relatively narrower than the targeting imager field of view 136. As a non-limiting example, in at least some implementations the targeting imager field of view 136 is between 10 degrees and 70 degrees (e.g., 26 degrees) and the scanning imager field of view is between 2 degrees and 10 degrees (e.g., 3 degrees). In at least some implementations, the targeting imager 134 is a three dimensional imager, such as a stereo imager or a time-of-flight imager. The targeting imager 134 and scanning imager 106 together define a scanning volume 113, which is the overlapping area that can be imaged by both the target imager and the scanning imager.

The control subsystem 118 is communicatively coupled to the targeting imager 134 to receive information directly or indirectly therefrom. The control subsystem 118 is communicatively coupled, e.g., via steering mirror actuator 116, to cause the steering mirror 110 to steer the scanning imager field of view 108 based at least in part on information (e.g., depth information, velocity information) received via the targeting imager 134. Further, in at least some implementations, the control subsystem 118 communicatively coupled to the variable focus lens 128 to adjust the focus of the scanning imager 106 based at least in part on information received from the targeting imager 134. In at least some implementations, using the object identification information detected by the targeting imager 134, the control subsystem 118 adjusts the focus concurrently with steering the scanning imager field of view 108 such that the scanning imager is "pre-focused" each frame, which allows the scanning imager 106 to capture images more rapidly.

The control subsystem 118 may include one or more controllers or processors, for example one or more microcontrollers or microprocessors 140, graphical processor units (GPUs) 142a, 142b, application specific integrated circuits (ASICs), programmable logic units (PLUs) or programmable gate arrays (PGAs). The control subsystem 118 may include one or more nontransitory storage media, for example one or more non-volatile and/or volatile nontransitory storage media, for instance one or more read only memories (ROM) 144, random access memories (RAM) 146, registers, Flash memory 148, spinning magnetic media and drive, spinning optical media and drive, etc. The one or more nontransitory storage media may store at least one of processor-executable instructions and/or data, which when execute by one or more controllers or processors, causes the controller(s) or processor(s) to perform the algorithms, methods and functions described herein.

The control subsystem 118 may further include one or more motor controllers 149 or other controllers communicatively coupled to control one or more actuators, for instance steering mirror actuators 116. The control subsystem 118 may include one or more wired or wireless communications ports 152 (e.g., USB®, RS-232, Wi-Fi®, Bluetooth®) to provide communications with various other elements of components of the imaging system 100, with other processor-based components 160, such as components in the environment 104 (e.g., POS terminal, backend inventory tracking system, SKU lookup system, other imaging systems 100) or other components or systems outside the environment 104 (e.g., ordering system, customer tracking system or customer loyalty system). The control subsystem 118 may further include one or more communications paths or channels, for example one or more buses 150, for instance communications buses, power buses, command or instruction buses, address buses, etc. The control subsystem 118 or a portion thereof may form a part of the object tracking subsystem 114.

In some implementations, the object tracking subsystem 114 determines a position of the object 102 (or a plurality of objects). The object tracking subsystem 114 may determine at least an estimate of a speed of the object 102, for example, if the object is moving (e.g., on a conveyor) relative to the imaging system 100. Additionally or alternatively, the object tracking subsystem 114 determines a direction of movement of the object 102, a size of the object, a shape of the object, a rotation of the object, etc.

Figure 2A:
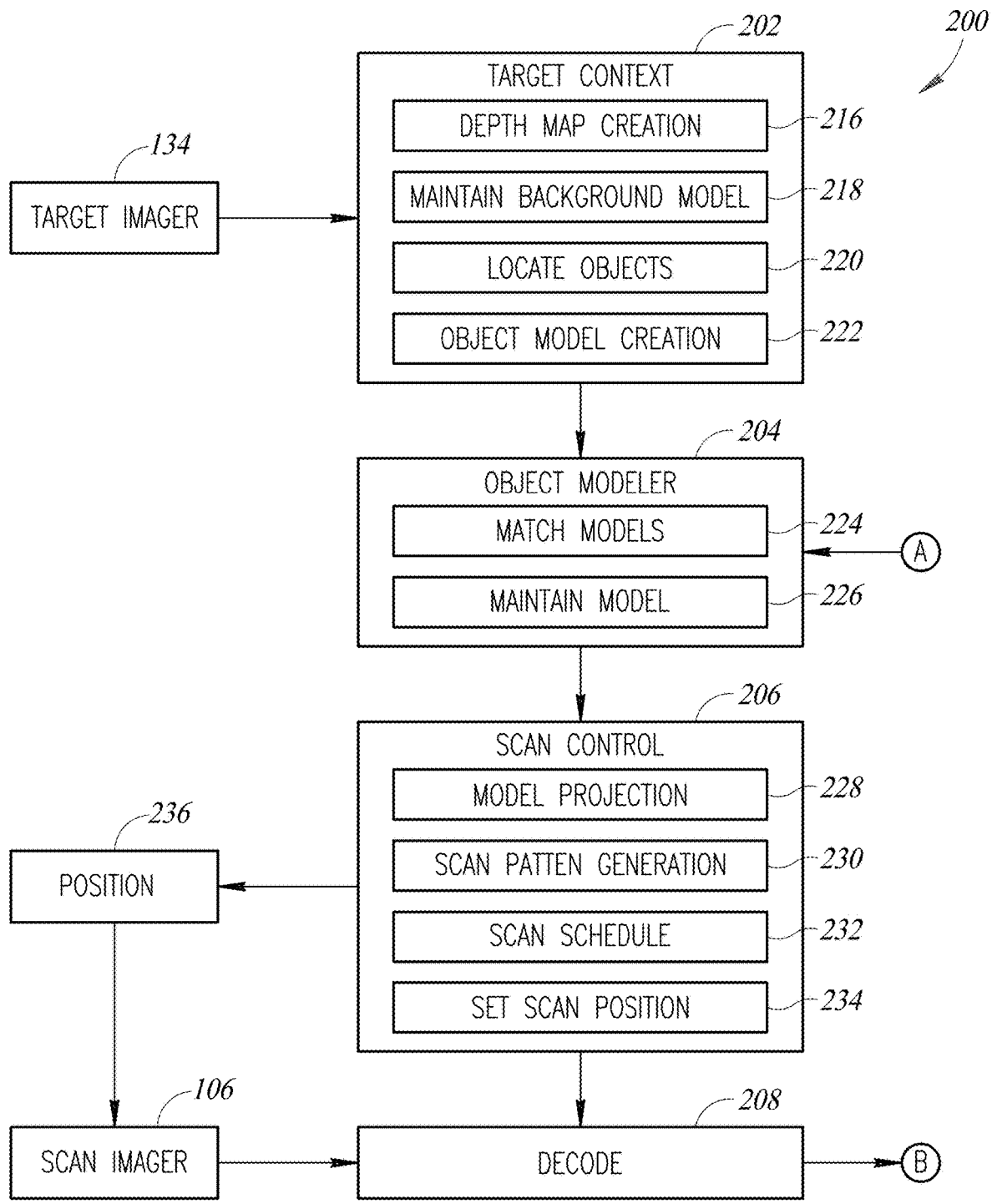
FIGS. 2A-2B are a schematic block diagram of various components of an imager system that includes a target imager and a scanning imager, according to one illustrated implementation.
Figure 2B:
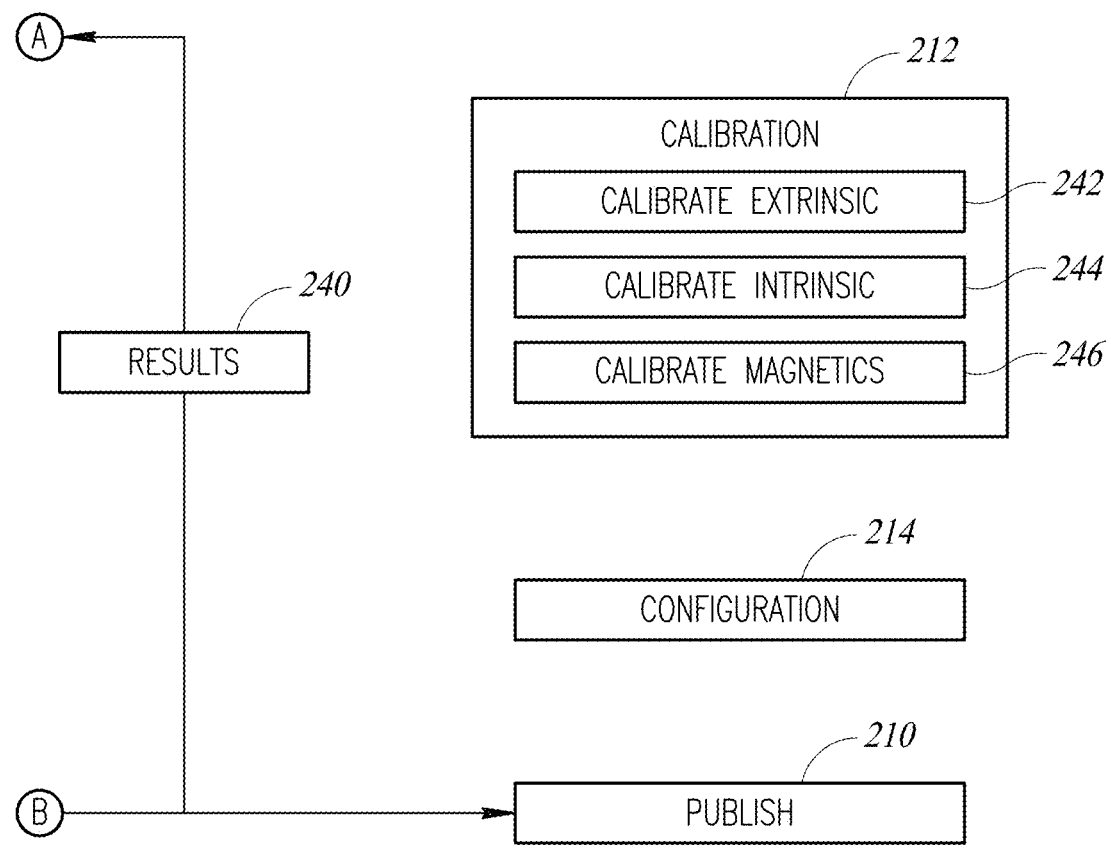

FIGS. 2A-2B are a schematic block diagram of various components of an imaging system 200 that includes a targeting imager 136 and a scanning imager 106. The imaging system 200 may be similar or identical to the imaging system of FIG. 1. In at least some implementations, the imaging system 200 may include more than one targeting imager and/or more than one scanning imager. The imager system 200 includes a target context component 202, an object modeler component 204, a scan control component 206, a decode component 208, a publish component 210, a calibrate component 212 and a configuration component 214. Each of these components, and their respective subcomponents, is discussed in further detail below.

The target context component 202 is the primary interaction with the targeting imager 134, and includes a depth map creation subcomponent 216, a maintain background model subcomponent 218, a locate objects subcomponent 220, and an object model creation component 222. The depth map creation component 216 converts each of the stereo images simultaneously captured by stereo cameras of the targeting imager 134 into a depth map, which is a 2D image where each pixel represents the distance from a baseline, indicated by line 115 of FIG. 1, to objects in the targeting imager field of view 136.

The maintain background model subcomponent 222 removes and labels as redundant static portions of the depth map generated by the target imager 134. The maintain background model subcomponent 222 segments the target frame into foreground (active) and background (ignore) areas. The maintain background model subcomponent 222 also adjusts to slow changes in the background areas.

The locate objects subcomponent 220 obtains the target frame foreground and determines if an object is present. The object model creation subcomponent 222 creates object models to represent objects that are found in a target frame. Each object model may include numerous characteristics about an object, such as position, size, bounding box, image of object, normal vectors (e.g., normal vector 117 of the object 102 of FIG. 1), etc.

The output of the target context component 202 is a list of object models for objects found in the current target frame. This list of object models is sent to the object modeler component 204.

The object modeler component 204 maintains the state of all of the objects present in the target imager field of view 136. The object modeler component 204 includes a match models subcomponent 224 and a maintain models subcomponent 226. The match models subcomponent 224 compares new object models found within the targeting image with a list of object models currently in the scanning volume 113 (FIG. 1). The match models subcomponent 224 matches new object models with current object models to generate updates. The match models subcomponent 224 also inserts objects found to be new objects into a current objects list. Further, the match models subcomponent 224 monitors when objects join (enter) the scanning volume 113 and when they separate (leave) from the scanning volume 113.

The maintain models subcomponent 226 updates the object models each cycle with new information created by the scanning imager 106 to keep the object models current. The maintain models subcomponent 226 may update position, orientation, direction, scanned sections, results of scans, etc., for each of a plurality of objects present in the scanning volume 113.

The output of the object modeler component 204 is a list of known objects in the scanning volume 113. Each object in this list has information about what portion of the object has been scanned and which portion of the object has not been scanned. The list is provided to the scan control component 206.

The scan control component 206 creates a strategy for scanning all of the objects in the scanning volume 113. Generally, the scan control component 206 examines the current list of objects provided by the object modeler component 204, their scan completed amount, and the predicted time remaining in the scanning volume. The scan control component 206 includes a model projection subcomponent 228, a scan pattern generation subcomponent 230, a scan schedule subcomponent 232 and a set scan position subcomponent 234.

The model projection subcomponent 228 creates a projection into the future for each object model in the scanning volume 113 using the object model current position, velocity and attitude. This projection may be completed for each object and for some future "look ahead" window.

The scan pattern generation subcomponent 230 creates a scan pattern to cover the object for each future projected object position. The subcomponent 230 may assign a utility value to each scan in the scan pattern. In at least some implementations, the utility value may be based on one or more factors, such as proximity of the object to leaving the frame, angle of incidence (skew) of a surface relative to the scanning imager 106, texture characteristics of the scan image as viewed in the target frame, previous scan results, etc.

The scan schedule subcomponent 232 takes the list of forward projected scans and utility values and determines a schedule (e.g., optimal schedule) to scan one or more objects in the scanning volume 113. In at least some implementations, the scan schedule subcomponent 232 optimizes the scan pattern to maximize capture coverage of each of the one or more objects present in the scanning volume 113.

The set scan position subcomponent 234 sends position commands 236 to the steering component (e.g., steering mirror 110) and focusing component (e.g., variable focus lens 128) of the scanning imager 106 to set the position and focus depth for the next scan position in the determined scan schedule.

The decode component 208 receives images from the scanning imager 106, and decodes machine readable symbols or labels (e.g., barcodes, watermarks) present in the images using suitable decoding/detection algorithms. The decode results 240 are sent to the object modeler component 204 for the scan regardless of whether a label has been found.

The publish component 210 manages the publication of results 240 received from the decode component 208. If a label is detected by the decode component 208, the publish component 210 formats the results via reporting channels.

The calibration component 212 is responsible for all calibration types for the imaging system 200. The calibration component includes a calibrate extrinsic subcomponent 242, a calibrate intrinsic subcomponent 244 and a calibrate magnetics subcomponent 246. The calibrate extrinsic subcomponent 242 locates calibration patterns in the target and scan frames, and applies detection methods to determine the relative position of the two frames. The calibrate intrinsic subcomponent 244 locates a calibration pattern in each frame, and determines distortion effects of the lens due to manufacture and placement around the imager. The calibrate magnetics subcomponent 246 applies test patterns to calibrate the articulating mirror control of the steering mirror 110 of the scanning imager 106.

The configuration component 214 provides methods and storage to accept configuration commands from an external source, such as an external processor-based device (e.g., POS terminal) communicatively coupled to the imaging system 200.

Figure 3:
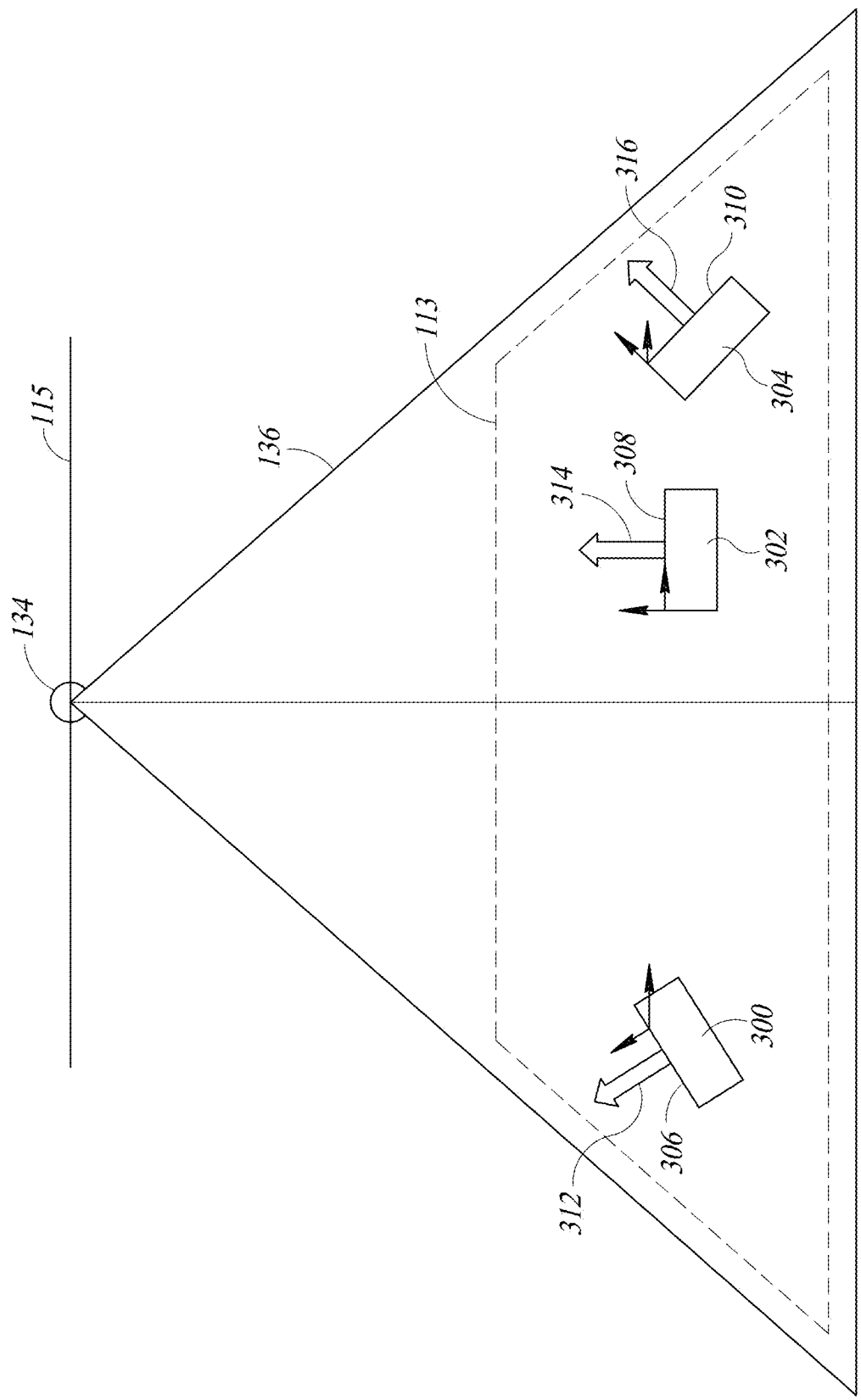
FIG. 3 is a schematic diagram of an imaging system showing how the targeting camera of an imaging system is used to generate a depth map, and to track facets of objects, according to one illustrated implementation.

FIG. 3 shows three objects 300, 302 and 304 that are within the targeting imager field of view 136 of the targeting imager 134. As discussed above, the targeting imager 134 may implement stereoscopic processing to produce depth maps for the scanning volume 113 which falls within the targeting imager field of view 136. The depth maps may be used to calculate the spatial position of objects in the scanning volume 113. As an example, the depth map may provide position information relative to the baseline 115 at the target imager 134 in suitable units (e.g., millimeters).

The depth map may be used to locate facets 306, 308 and 310 on the objects 300, 302 and 304, respectively, which facets are flat areas on the objects. For each of the facets 306, 308 and 310, normal vectors 312, 314 and 316, respectively, may be calculated. As shown, the normal vector for each facet is perpendicular to the face of the facet. Each object may have multiple facets (e.g., multiple surfaces of a box). The normal vector for each facet of each object may be specified in angular units of roll, pitch and yaw relative to the coordinate baseline of the targeting camera, for example. A facet with a normal vector that is not aligned with the boresight of the target imager (z-axis) will produce image skew.

Figure 4A:
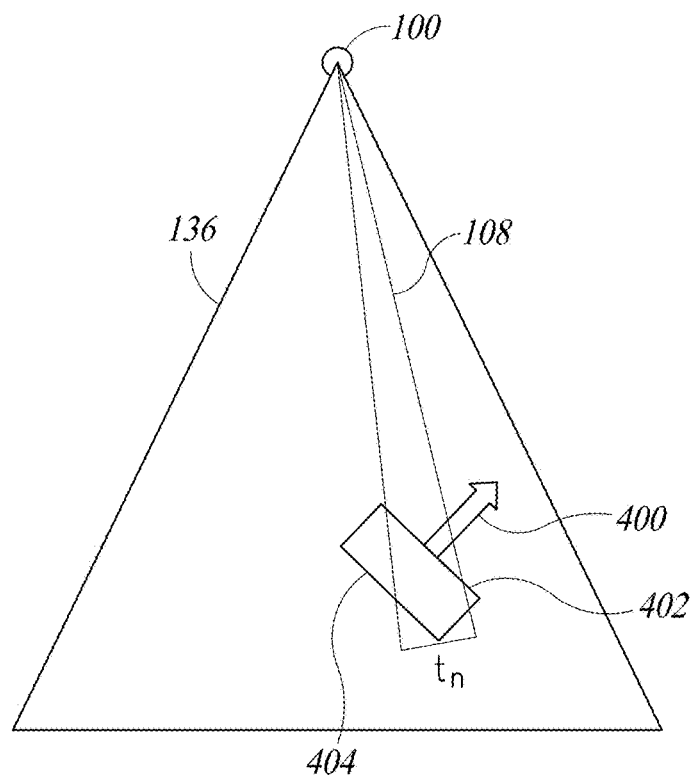
FIG. 4A is a schematic diagram that illustrates the presence of skew in an image of an object captured by a targeting imager of an imaging system, according to one illustrated implementation.
Figure 4B:
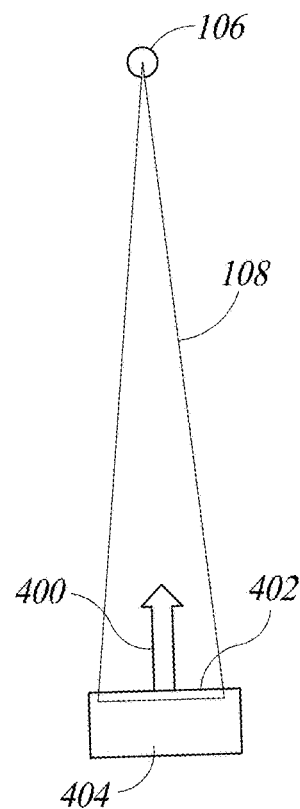
FIG. 4B is a schematic diagram that illustrates a skew corrected view of the object shown in FIG. 4A, according to one illustrated implementation.

FIGS. 4A and 4B illustrate a process for image skew correction using the imaging system 100. As noted above, the targeting camera 134 produces a normal vector 400 for each facet (e.g., facet 402) of an object 404 within the targeting imager field of view 136. The scanning imager 106 acquires an image of the object 402 within the scanning imager field of view 108 and uses the normal vector 400 detected by the targeting imager 134 to create an affine transform to reverse the skew effects on the image. As shown in FIG. 4B, skew correction has the effect of making the object facet 402 appear to be facing the scanning imager 106. This skew correction may be helpful or required for some machine-readable symbol decoding and/or object detection applications.

Figure 5:
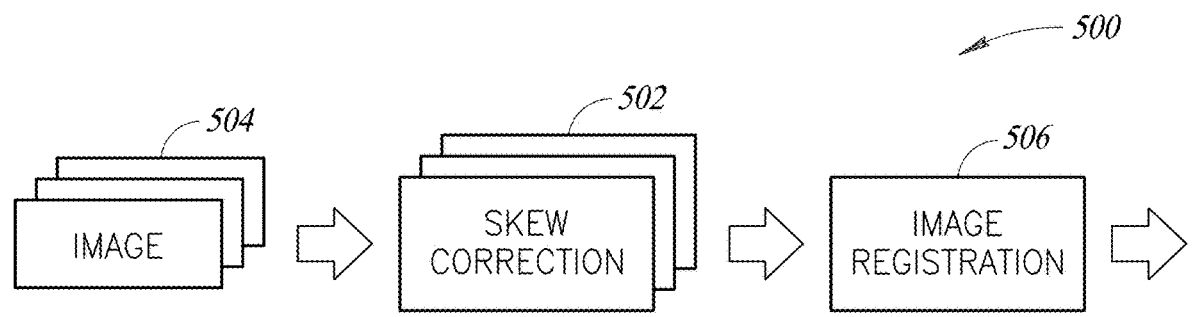
FIG. 5 illustrates a process for multi-exposure registration, which may be advantageous for scanning objects which have a size that is larger than a scanning imager field of view of a scanning imager, according to one illustrated implementation.

FIG. 5 illustrates a process 500 for multi-exposure registration, which may be advantageous for scanning objects which have a size that is larger than the scanning imager field of view 108 of the scanning imager 106. As shown, at least one processor of an imaging system (e.g., imaging system 100) may apply skew correction 502 to a number of images or scan frames 504 captured by the scanning imager 106 at different times, wherein the images have at least some overlap with each other to provide common reference points. Each exposure may have a unique normal vector as the object may be in motion (e.g., rotating, moving on a conveyor, moving in a user's hand) during the scan sequence. Then, the at least one processor of the imaging system may implement an image registration process 506 to register adjacent scan images so that a composite resultant image may be used for high resolution recognition systems, which in turn may be used in any number of applications (e.g., self-checkout system).

Figure 6A:
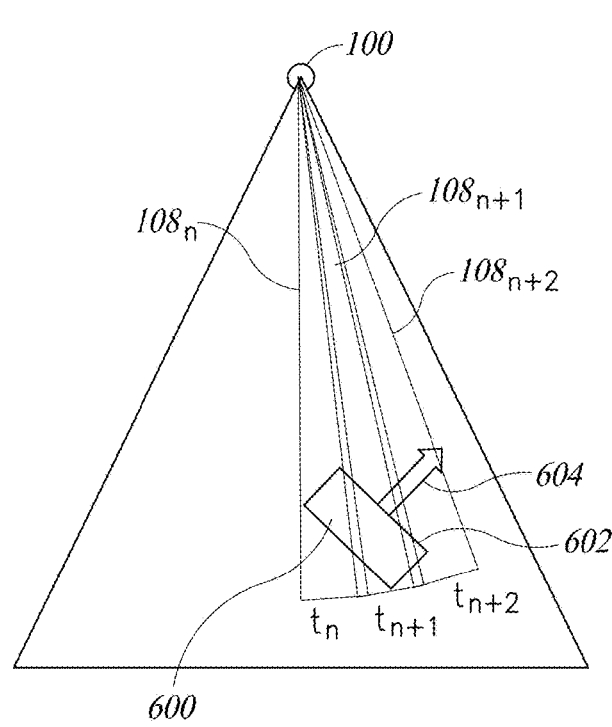
FIG. 6A is a schematic view of an object which is captured by a scanning imager over three sequential frames which correspond to three scanning imager fields of view, according to one illustrated implementation.
Figure 6B:
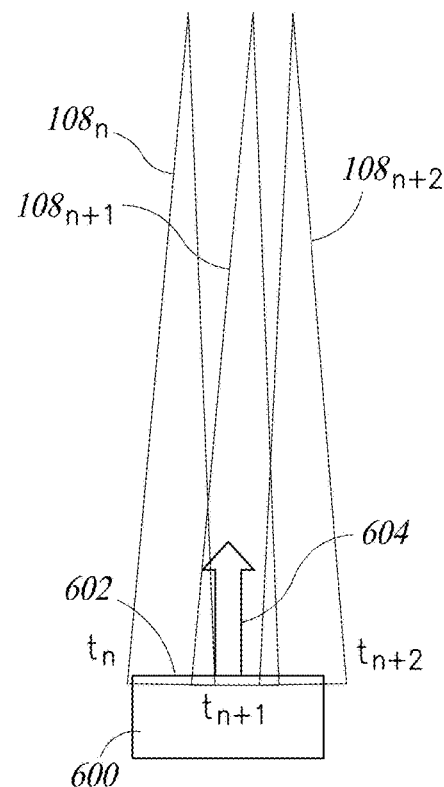
FIG. 6B is a schematic diagram that illustrates a skew corrected view of the object shown in FIG. 6A, according to one illustrated implementation.

FIG. 6A shows a schematic view of an object 600 which is captured by the scanning imager 106 over three sequential frames $t_n$, $t_{n+1}$, $t_{n+2}$ which correspond to three scanning imager fields of view $108_n$, $108_{n+1}$, and $108_{n+2}$, respectively. As shown, the scanning imager fields of view $108_n$, $108_{n+1}$, and $108_{n+2}$ are overlapping, such that although entire facets (e.g., facet 602) of the object 600 are not captured in a single frame, the plurality of frames may be registered to generate a composite resultant image which fully covers one or more facets of the object 600. FIG. 6B shows a skew corrected view of the object 600 after the skew correction process 502 (FIG. 5) has been applied to the frames $t_n$, $t_{n+1}$, $t_{n+2}$ for the facet 602 using a normal vector 604 determined by the targeting imager 134. As shown, skew correction has the effect of making the object facet 602 appear to be facing the scanning imager 106.

Figure 7:
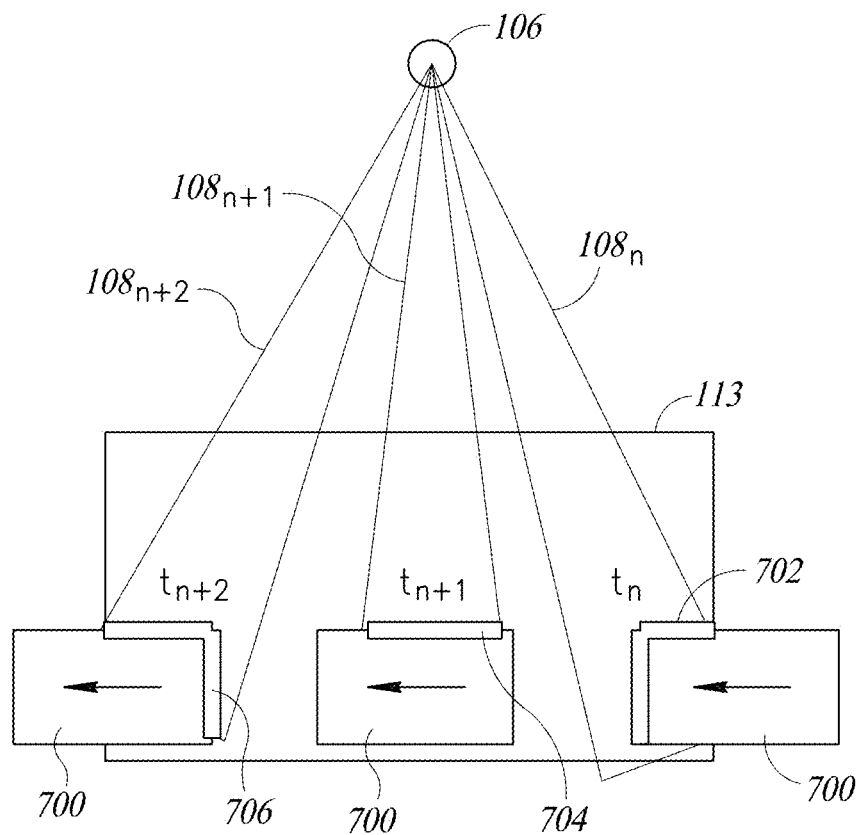
FIG. 7 is a schematic diagram which shows an example scan pattern which may be used by a scanning imager to capture an object as the object moves from right to left through the scanning volume of an imaging system, according to one illustrated implementation.

FIG. 7 shows an example scan pattern which may be used by the scanning imager 106 to capture an object 700 as the object moves from right to left (as shown) through the scanning volume 113 of the imaging system 100. As discussed above, the scan pattern generation subcomponent 230 (FIG. 2A) of the scan control component 206 operates to drive the scanning imager 106 through an optimized sequence of positions, with the goal of maximizing the area of each object scanned. The generated scan pattern may be dynamic and based on object context, including information about objects in the targeting imager field of view 136, such as positions, velocities, attitudes, quantity, and/or other information that is used to create/modify the scan pattern sequence.

As shown in FIG. 7, the object 700 moves from right to left in the scanning volume 113. A leading edge 702 of the object 700 is visible the moment the object enters the scanning volume 113 and may be captured by the scanning imager 106 at a first field of view $108_n$. A top surface 704 of the object 700 is visible when the object is midway through the scanning volume 113 and may be captured by the scanning imager 106 at a second field of view $108_{n+1}$. A trailing edge 706 of the object 700 is only visible as the object leaves the scanning volume 113, and may be captured by the scanning imager 106 at a third field of view $108_{n+2}$. The scan sequence generation subcomponent 230 detects the movement of the object 700 and causes the scanning imager 106 to capture three scans, $t_n$, $t_{n+1}$ and $t_{n+2}$, in sequence. The size of the object 700, velocity of the object, direction of movement of the object, scanning imager field of view, and/or other variables may be used to determine how best to generate the scan sequence to capture the object as it moves through the scanning volume 113.

The scan pattern generation subcomponent 230 (FIG. 2A) may utilize several constraints when generating a scan pattern to determine the optimal scan pattern to capture the object present in the scanning volume 113. Such constraints may include constraints relating to object entry, object exit, object attitude, field of view overlap, skew limits, partial labels, and multiple objects, for example. The object entry constraint recognizes that objects can enter the scanning volume 113 at an unpredictable rate. Often, the leading edge of an object may only be available for scanning upon entry of the object into the scanning volume 113. The object exit constraint recognizes that all objects must be scanned prior to exiting the scanning volume 113. Additionally, trailing edges of objects are often best scanned when the object moving through the scanning volume is about to exit the scanning volume 113.

Attitude change for an object may be measured by changes in the normal vector of one or more facets of an object. Changes in attitude reveal new areas on objects as well as obscure (e.g., due to high skew angle) previously visible areas on objects. Thus, detected attitude changes may force the scanning imager 106 to rescan a previously scanned object to capture areas newly revealed due to the attitude changes.

The overlap constraint requires adjacent scans of an object to overlap by a determined amount (e.g., percentage of the scanning imager field of view 108). This constraint allows registration of multiple scans and symbol overlap for label stitching, as discussed elsewhere herein.

At some point the angle of the normal vector of a facet of an object relative to the boresight of the scanning imager 106 becomes so steep that reading of the facet becomes ineffective. The skew limits constraint tracks the skew of facets of objects to ensure that facets are scanned prior to the skew limits being reached.

A residual portion of a label segment may be outside of a current scanning imager field of view, such that a label is only partially scanned. The partial label scan constraint detects such occurrence and requests a new scan that scans an area adjacent to where the partial label segment was detected, to ensure that entire labels are scanned.

In at least some implementations, multiple objects may be present in a frame and may occlude each other as the objects move through the scanning volume 113. The multiple objects constraint accounts for such multiple objects so that the area of each of the objects scanned may be optimized.

Figure 8A:
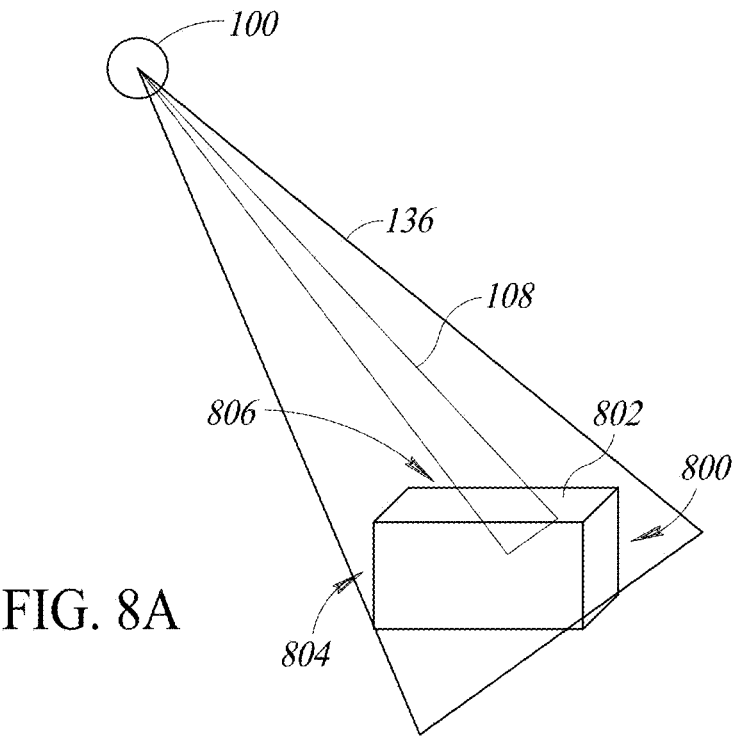
FIG. 8A is a schematic diagram which shows a targeting imager capturing an image of an object to generate a scan pattern, according to one illustrated implementation.
Figure 8B:
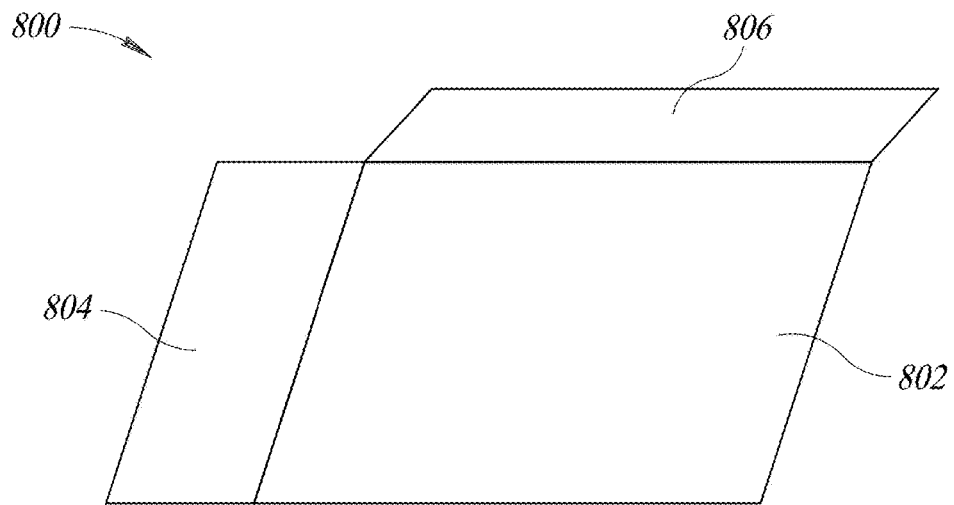
FIG. 8B shows a two dimensional target image of the object shown in FIG. 8A, according to one illustrated implementation.
Figure 8C:
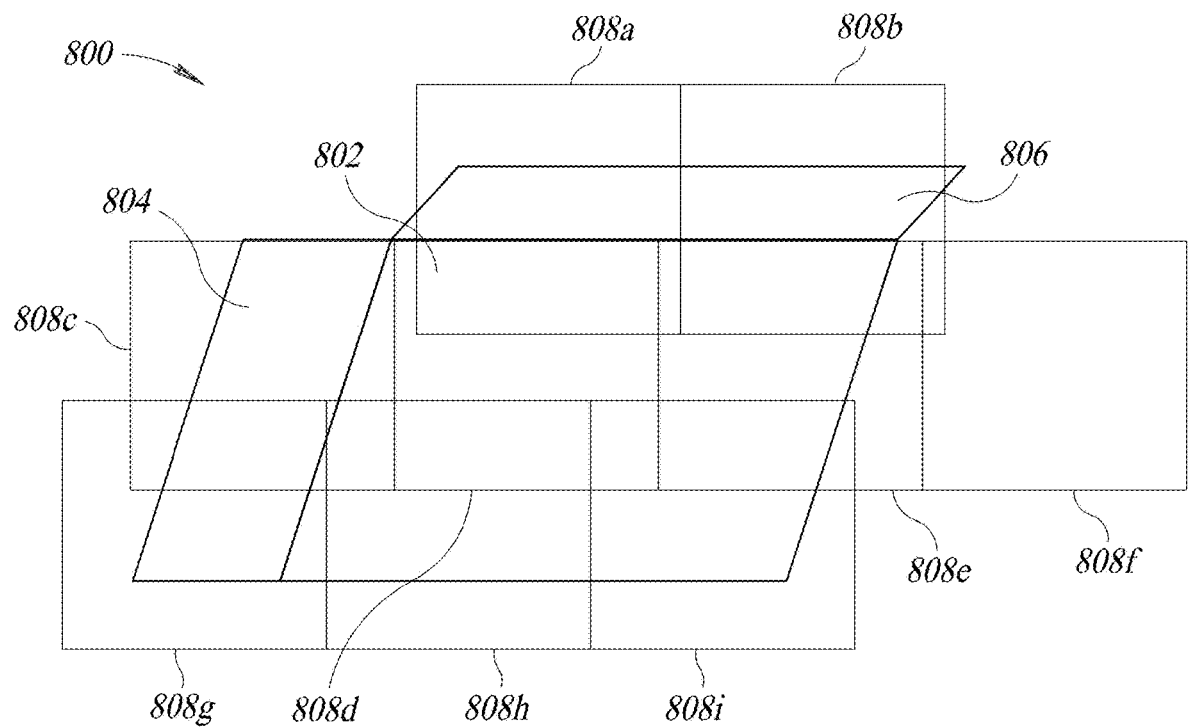
FIG. 8C shows a plurality of scan regions generated a scan pattern generator to capture scanning images of the object of FIG. 8A, according to one illustrated implementation.

FIGS. 8A-8C illustrate an example implementation of the scan pattern generation subcomponent 230. As shown in FIGS. 8A and 8B, an object 800 may be viewed by the targeting imager 134 as being projected into a two dimensional target image, which shows a top surface 802, a front surface 804, and lateral surface 806 of the object. The depth map generated by the targeting imager 134 may be used to calculate normal vectors for each pixel on the object. Next, the scan pattern generation component 230 may set each pixel value in the target image to the value of the normal vector at that point on the object. Then, as shown in FIG. 8C, the scan pattern generation component 230 divides the now flat (2D) normal vector projection into overlapping areas that each correspond to the size of the scanning imager field of view. As discussed above, the scan pattern generation component 230 provides an overlap of the scanning imager fields of view 808a-j (FIG. 8C) between adjacent scans. In at least some implementations, the scan pattern may be subdivided if diverse normal vectors are detected.

The imaging systems disclosed herein may be considered to include a conceptual stack of layers comprising a perception layer, which includes 2D and 3D imagers such as the targeting imager 134 and scanning imager 106 discussed above, a comprehension layer, which includes various imaging processing algorithms, and a solutions layer, which includes application software to implement the desired function (e.g., self-checkout system).

The perception layer hardware of the imaging systems may include one or more 2D scanning imagers (e.g., global shutter machine-readable symbol imager), one or more steering components (e.g., fast steering mirrors) operatively coupled to the one or more 2D imagers, and one or more 3D targeting imagers (e.g., stereo imager, time-of-flight imager). The comprehension layer may include software to implement machine-readable symbol reading, watermark decoding, visual pattern recognition (e.g., 3D visual pattern recognition), 3D object recognition, object tracking, and/or human action recognition, as discussed herein.

Figure 9A:
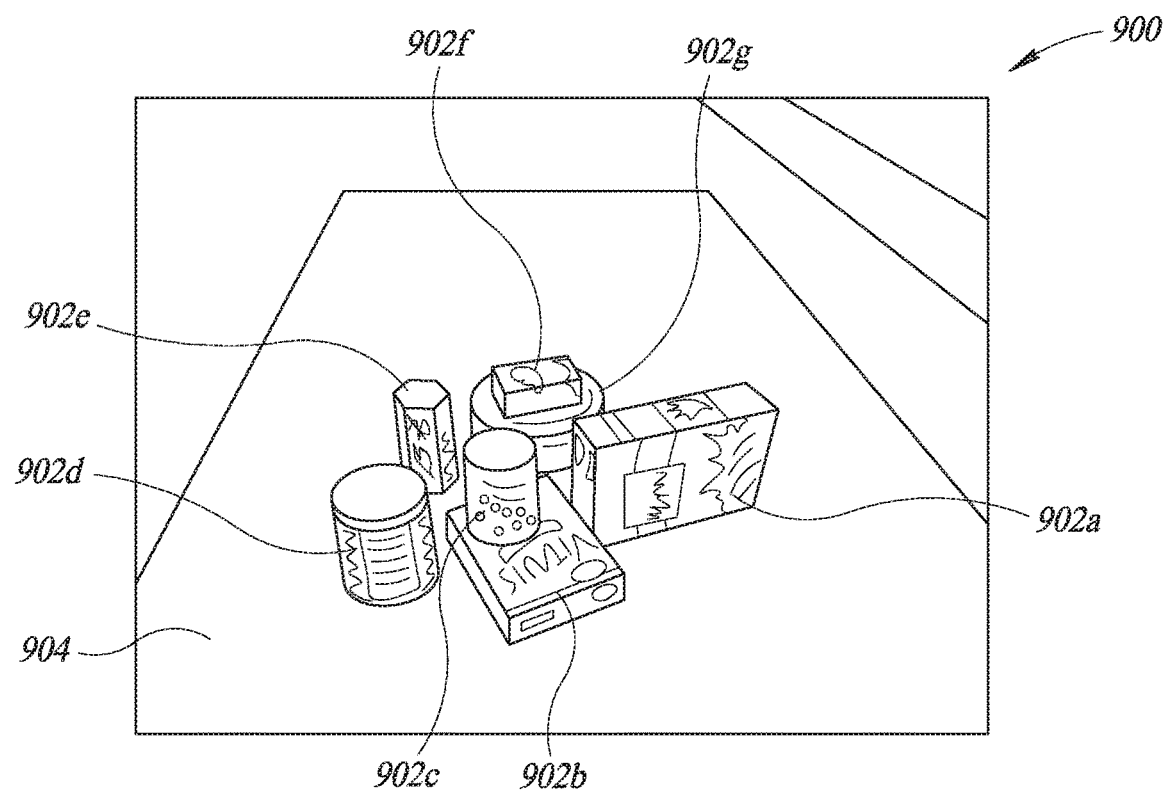
FIG. 9A is an image of a plurality of objects which are to be tracked, according to one illustrated implementation.
Figure 9B:
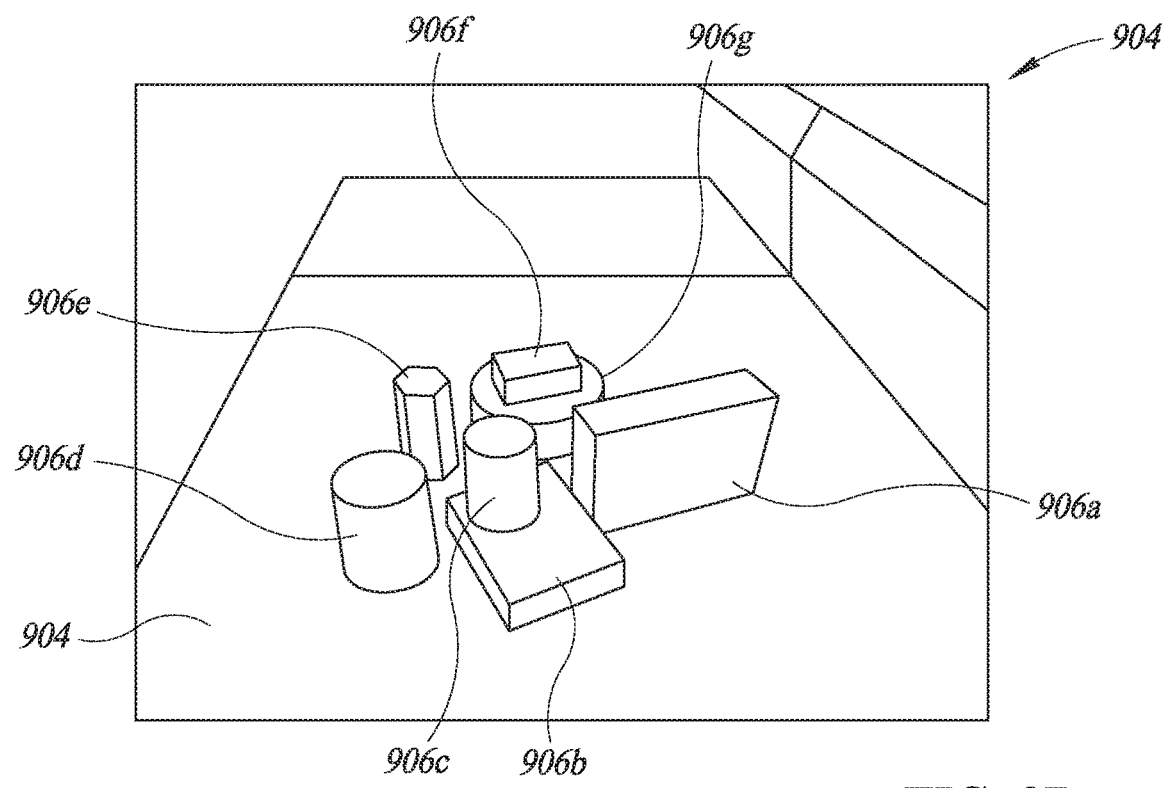
FIG. 9B is an image which depicts representations of the plurality of objects of FIG. 9A after a segmentation process, according to one illustrated implementation.

FIG. 9A shows an image 900 of a number of objects 902a-f placed on a table 904. FIG. 9B shows an image 904 that is a result of a segmentation process implemented by the targeting imager 134 (FIG. 1) to segment the objects 902*a-f*, such that the objects may be tracked and targeted for scanning by the scanning imager 106. The image 904 includes object representations 906*a-f* which correspond to the objects 902*a-f*, respectively. In at least some implementations, a database lookup may be segmented by object size and/or surface face to limit the size of the database lookup and to increase recognition accuracy, which may be particularly beneficial in the case of similar looking objects which have different sizes.

Figure 10A:
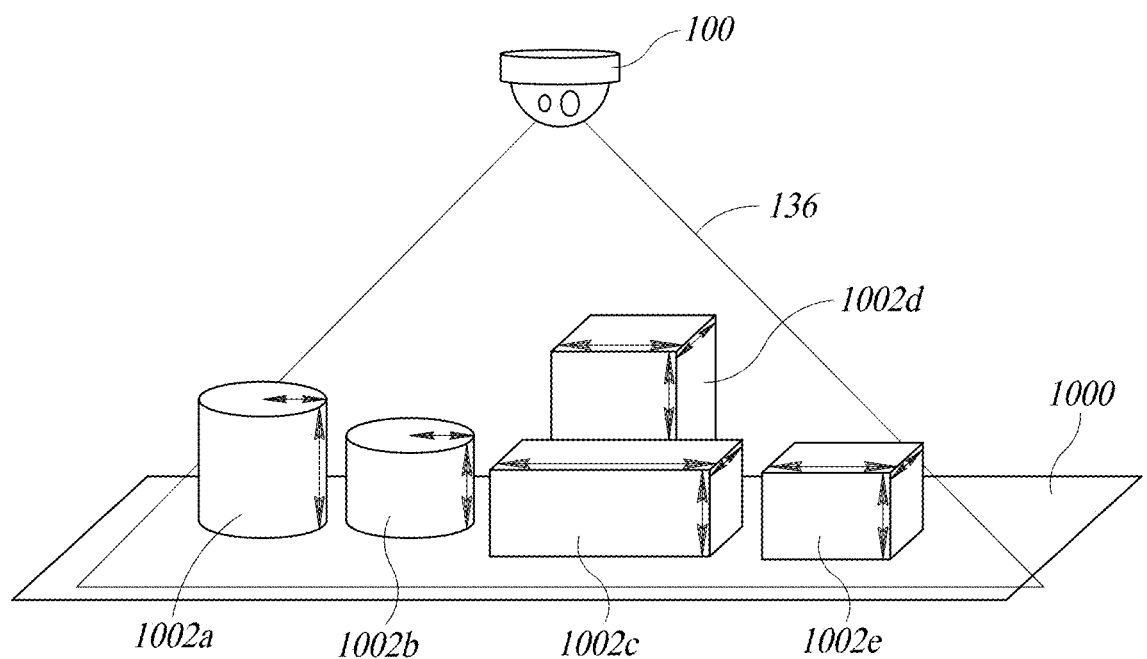
FIG. 10A is a pictorial view of an imaging system having a targeting imager field of view directed toward a surface which contains a number of objects, the imaging system operative to determine at least one size dimension of each of the number of objects, according to one illustrated implementation.
Figure 10B:
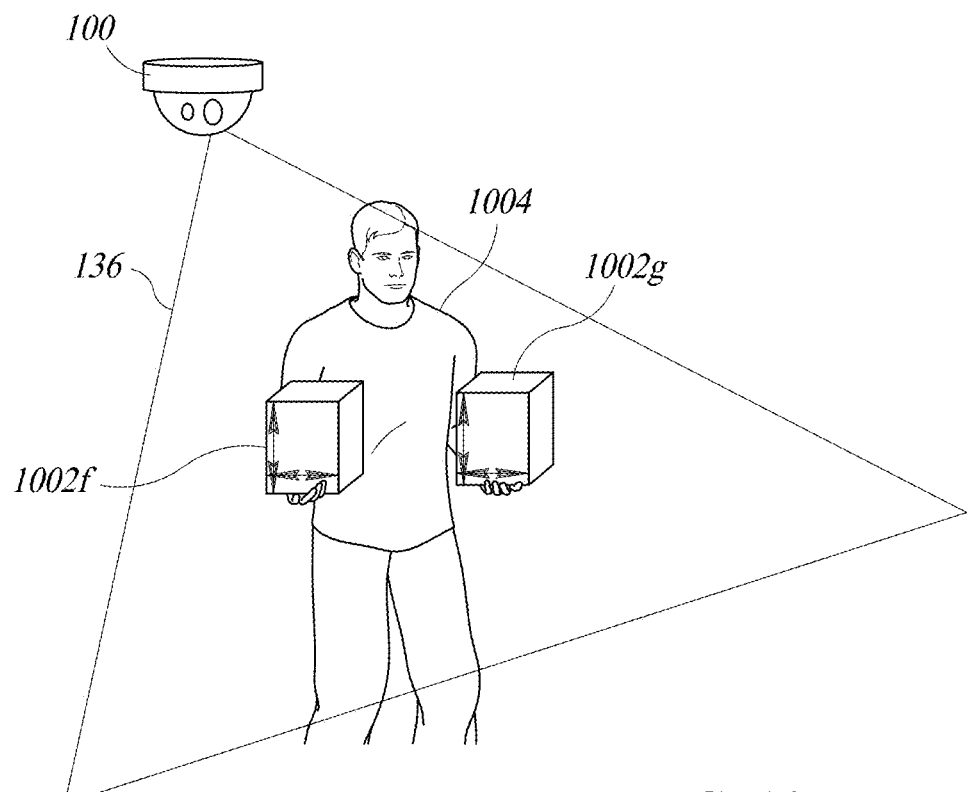
FIG. 10B is a pictorial view of an imaging system having a targeting imager field of view directed toward a user who is carrying a number of objects, the imaging system operative to determine at least one size dimension of each of the number of objects carried by the user, according to one illustrated implementation.

FIG. 10A shows an imaging system 100 having a targeting imager field of view 136 directed toward a surface 1000 (e.g., conveyor) which contains a number of objects 1002*a-e*. FIG. 10B shows an imaging system 100 having a targeting imager field of view 136 directed toward a person 1004 (e.g., customer) carrying multiple objects 1002*f-g*. In each application, the imaging system 100 may measure various characteristics of the objects 1002*a-g*, including locations in space, motion, and/or shape and size (e.g., length, width, height). Applications for such dimensioning and tracking may include, for example, visual pattern recognition, in-hand scanning, palletization, package shipping or robot pick and pack.

Figure 11A:
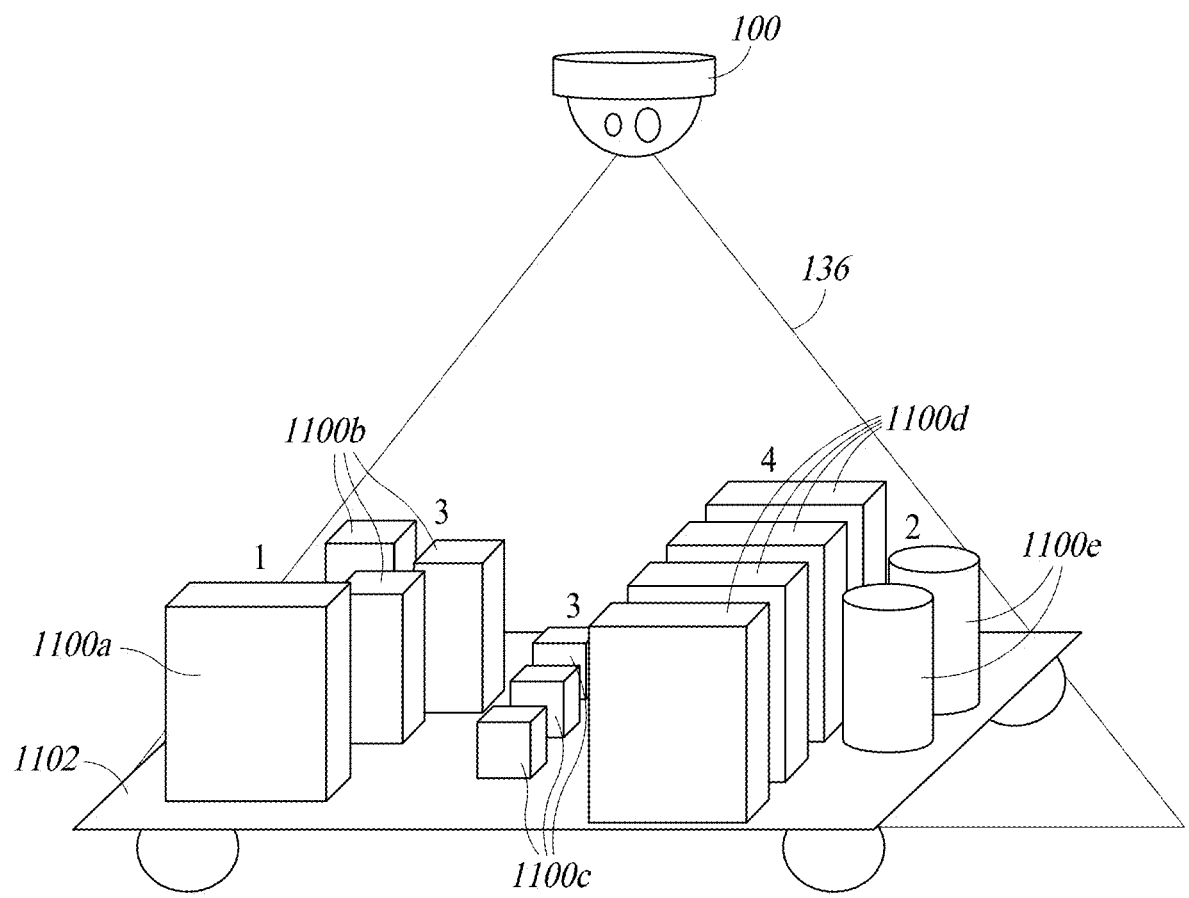
FIG. 11A is a pictorial view of an imaging system having a targeting imager field of view directed toward a surface which contains a number of objects, the imaging system operative to determine a count of the number of objects, according to one illustrated implementation.
Figure 11B:
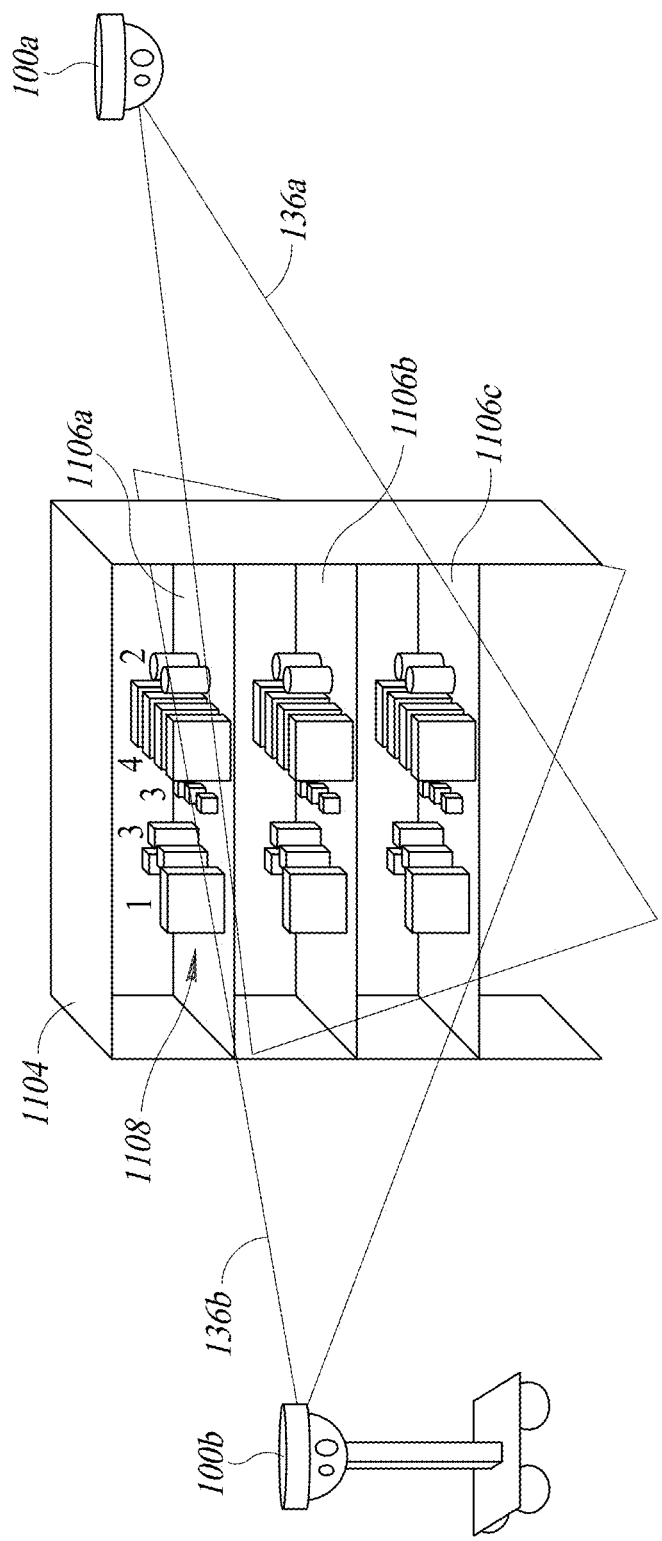
FIG. 11B is a pictorial view of an imaging system having targeting imager fields of view of two target imagers directed toward a case which contains a number of objects on shelves thereof, the imaging system operative to determine a count of the number of objects in the case, according to one illustrated implementation.

FIGS. 11A and 11B show examples of how one or more imaging systems of the present disclosure may be used to count the number of objects in a field of view. In particular, FIG. 11A shows a number of types of objects 1100*a-e* positioned on a surface 1102 (e.g., countertop, conveyor), with an imaging system 100 disposed above the surface and having a field of view 136 directed downward toward the surface. In the illustrated example, the imaging system 100 may determine that there is 1 object 1100*a*, 3 objects 1100*b*, 3 objects 1100*c*, 4 objects 1100*d*, and 2 objects 1100*e*.

FIG. 11B shows a case 1104 which includes three shelves 1106*a-c* that each contain a plurality of objects 1108 thereon. In the implementation of FIG. 11B, two imaging systems 100*a-b* are positioned on opposite sides of the case 1104. Each of the imaging systems 100*a-b* may implement the functionality of the various imaging systems discussed herein. For example, each of the imaging systems 100*a-b* may include at least one scanning imager and at least one targeting imager. In other implementations, each of the imaging systems 100*a-b* may include a targeting imager, but only one of the imaging systems includes a scanning imager. In other implementations, each of the imaging systems 100*a-b* may include a scanning imager, but only one of the imaging systems includes a targeting imager. The imaging system 100*a* has a field of view 136*a* directed toward the case 1104 from a first orientation, and the imaging system 100*b* has a field of view 136*b* directed toward the case from a send orientation different from the first orientation. Together, the imaging systems 100*a-b* are able to detect the presence and/or movement of the objects 1108 on the shelves 1106*a-c* of the case 1104 using the methods discussed herein. The systems shown in FIGS. 11A and 11B may be used in various applications, such as warehouse pick audits, POS checkout systems, automatic inventor checking systems, etc.

Figure 12:
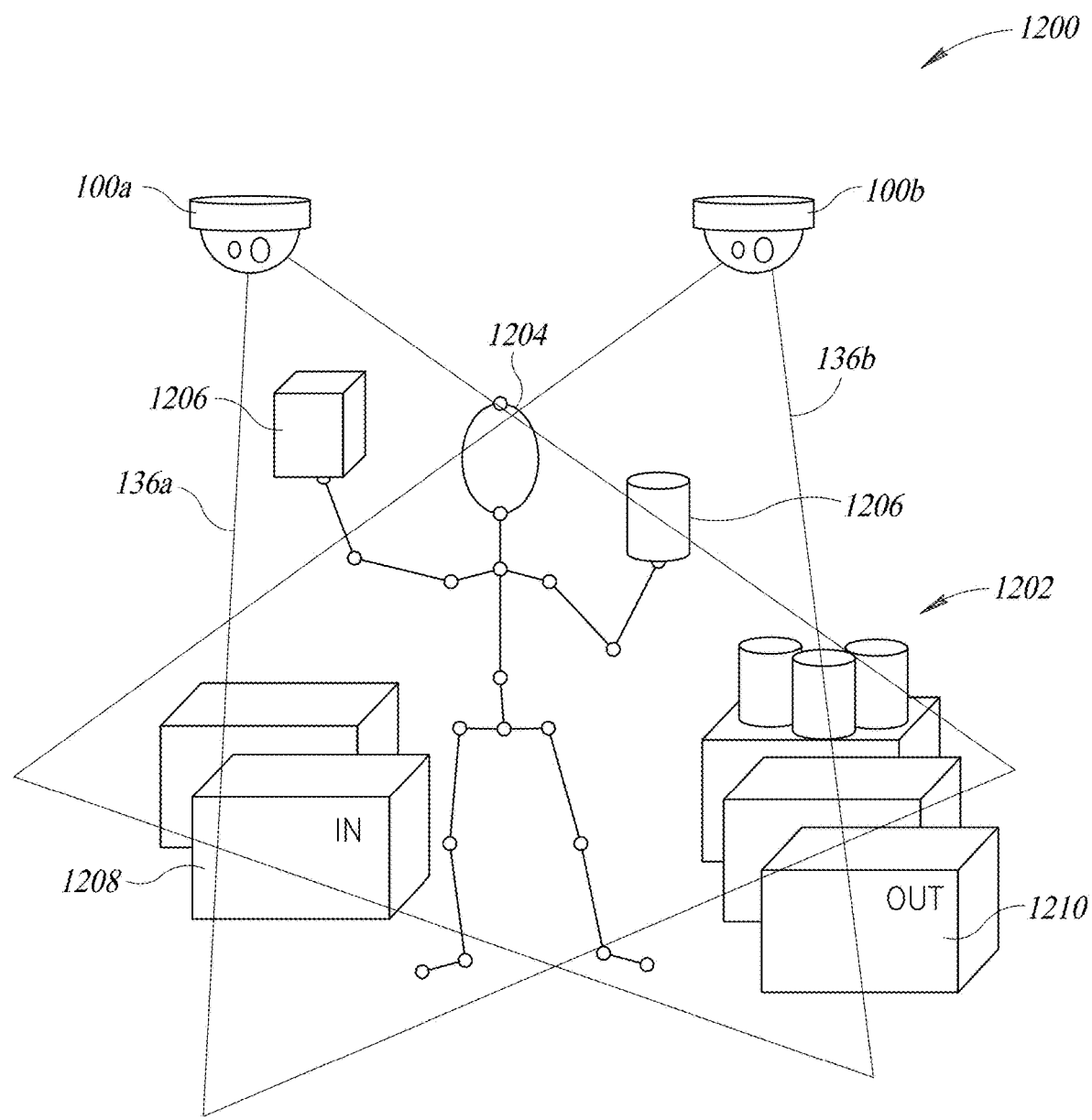
FIG. 12 is a pictorial view of an imaging system that may be used to implement human action recognition in an environment, such as a retail environment, according to one illustrated implementation.

FIG. 12 shows a system 1200 that may be used to implement human action recognition in an environment 1202, such as a retail environment. The system 1200 may include multiple imaging systems 100 (two shown, designated 100*a-b*) which are coordinated with each other and each include a respective field of view 136*a-b* directed toward the environment 1202. In this example, the system 1200 may calculate a skeletal model 1204 for a person in the environment 1202 which is moving objects 1206 from a first "IN" location 1208 to a second "OUT" location 1210. The first location 1208 may be the location of a shopping cart, and the second location 1210 may be a bagging area, for example. The system 1200 may implement the functionality discussed herein to calculate the skeletal model 1204 of the human, track hand positions, interpret gestures, etc. The system 1200 may be used in various applications, including retail applications such as fraud detection, location marketing, in-hand scanning, or a natural POS interface, or industrial applications, such as verification of pick/place applications, safety applications, or palletization assist applications.

Figure 13:
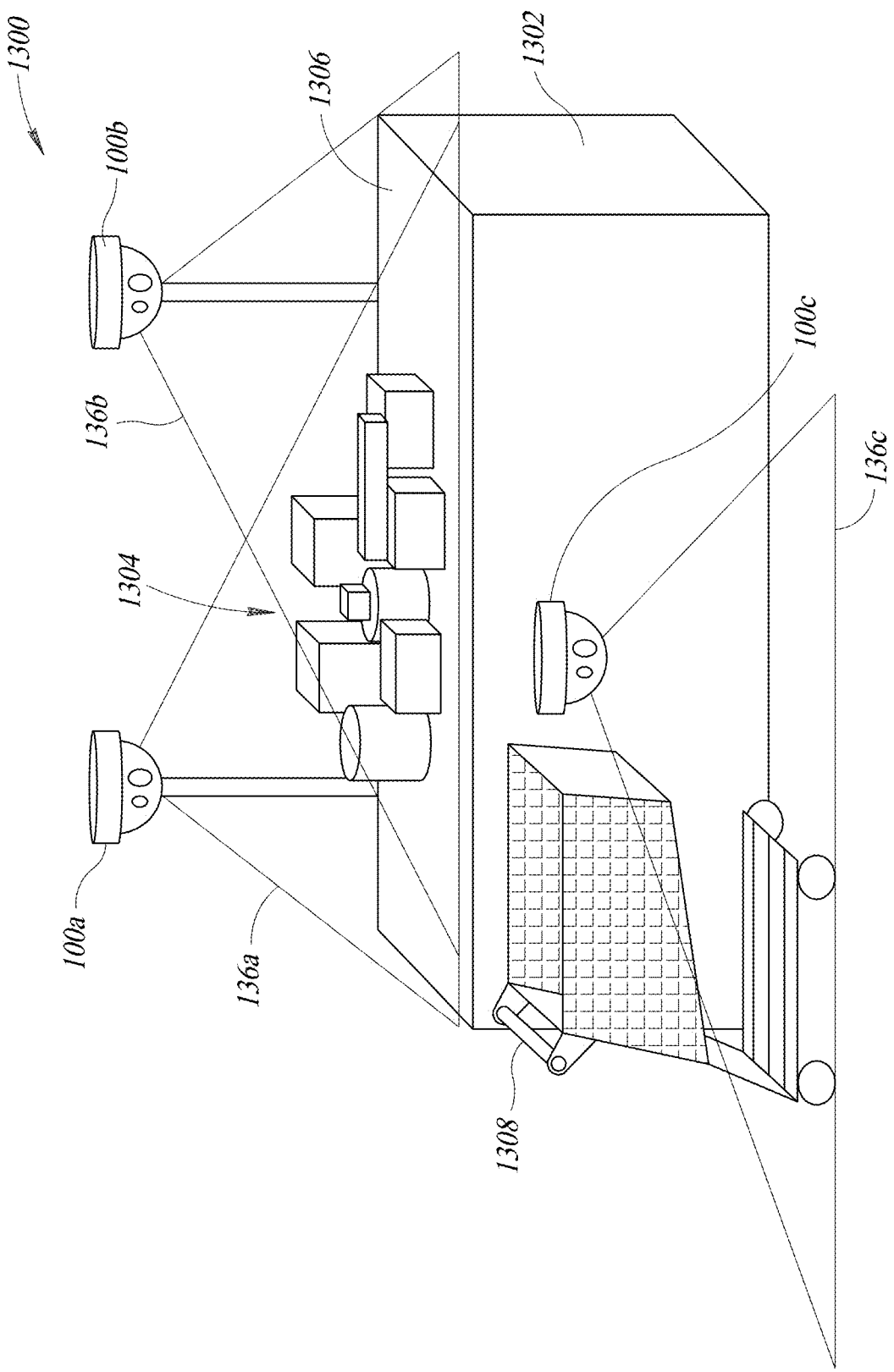
FIG. 13 is a pictorial view of a self-checkout system which implements at least some of the features of the present disclosure, according to one illustrated implementation.

FIG. 13 shows a self-checkout system 1300 which implements at least some of the features discussed herein. The self-checkout system 1300 includes three imaging systems 100*a-c* disposed proximate a checkout counter 1302 which supports a plurality of objects 1304 on a top surface 1306 of the checkout counter. The top surface 1306 of the checkout counter 1302 may include a stationary surface and/or may include a conveyor (e.g., conveyor belt) to move the objects 1304 similar to conventional checkout systems. The imaging systems 100*a* and 100*b* are disposed above the checkout counter 1302 and the imaging system 100*c* is disposed in front of the checkout counter. The imaging systems 100*a-b* may include respective fields of view 136*a-b* to detect objects on the top surface 1306, while the imaging system 100*c* may include a field of view 136*c* to detect objects carried by a shopping cart 1308, for example. In other implementations, the self-checkout system 1300 may include more or less imaging systems 100 to provide suitable object detection capabilities. Advantageously, the self-checkout system 1300 of FIG. 13 may allow for stacked objects and objects positioned close to each other, improved checkout flow, improved customer surface, and integrated loss prevention tracking.

Figure 14:
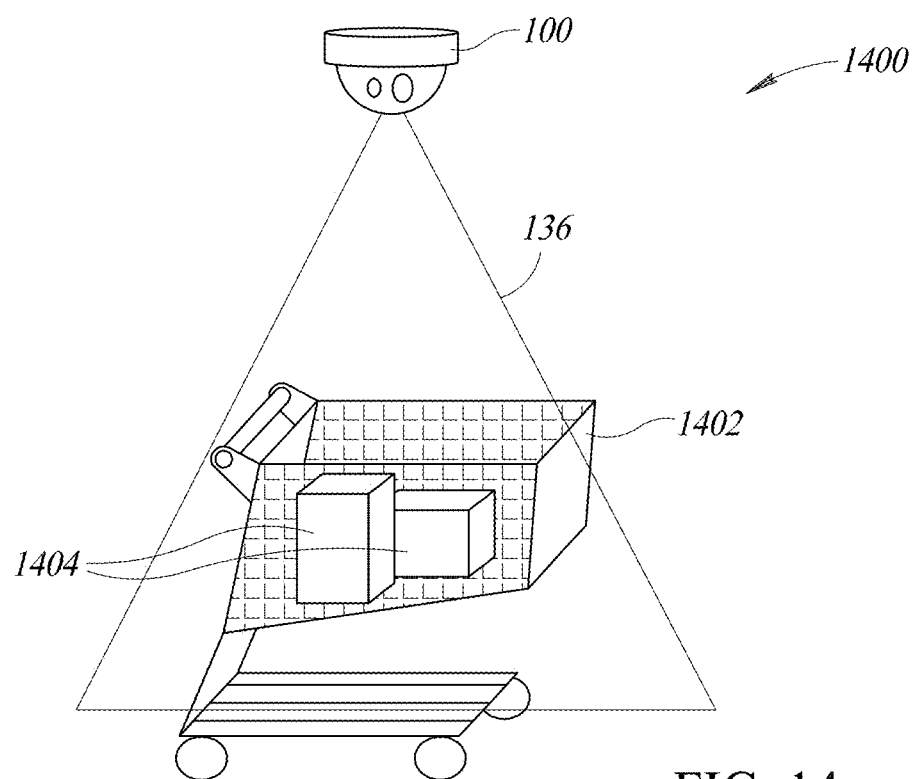
FIG. 14 is a pictorial view of an "in-cart" self-checkout system, according to one illustrated implementation.

FIGS. 14-17 shows various examples of self-checkout systems which may be implemented using the features discussed herein. In particular, FIG. 14 shows an "in-cart" system 1400 which utilizes an imaging system 100 having a field of view 136 directed downward to view into a shopping cart 1402 from above. Objects 1404 in the shopping cart may be segmented using the targeting imager of the imaging system 100, as discussed above. The objects 1404 may be identified using the targeting imager (e.g., the native 2D imagers of a stereo imager) or using a steerable scanning imager (e.g., scanning imager 106) of the imaging system to provide high resolution imagery. The in-cart system 1400 may implement a full self-checkout system or may at least detect the presence of objects to supplement loss-prevention.

Figure 15:
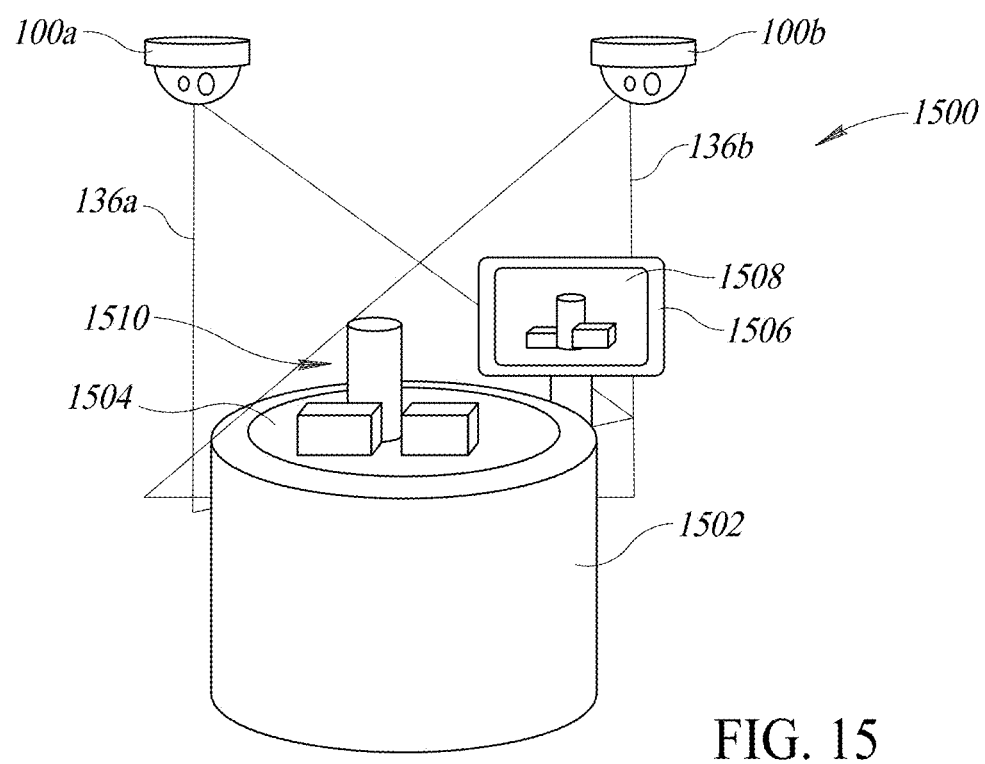
FIG. 15 is a pictorial view of a self-checkout kiosk system that includes a plurality of imaging systems, according to one illustrated implementation.

FIG. 15 shows a self-checkout kiosk system 1500 which includes a plurality of imaging systems 100*a-b* (e.g., two imaging systems), a checkout counter 1502 having a top surface 1504, and a processor-based device 1506 which includes a user interface 1508 (e.g., touchscreen, speaker). The imaging systems 100*a-b* may have respective fields of view 136*a-b* directed toward the top surface 1504 of the checkout counter 1502 to detect objects 1510 placed on the top surface by a customer wishing to purchase the objects. During operation, information from each of the imaging systems 100*a-b* may be combined or "fused" to provide more detailed information (e.g., size, location, shape) for the objects 1510. Further, the multiple imaging systems 100*a-b* may provide better imagery of the objects 1510 by providing different views of the objects, which may be advantageous in instances where portions of an object may not be visible to a single imager.

In operation, a customer may place numerous products on the top surface 1504 of the counter 1502 and the system 1500 will autonomously recognize and identify the objects 1510, and automatically provide the prices for each of the objects. The objects 1510 may be added to a transaction list which is shown to the user on the display 1508 of the processor-based device 1506, along with a total cost. For a relatively small number of items, the self-checkout kiosk 1500 may be faster than individually scanning the items, and may be a more natural process, similar to what a customer would have done in conventional checkout systems which utilize a human operator. Generally, the self-checkout kiosk 1500 improves productivity and provides a more intuitive process for untrained customers.

Figure 16:
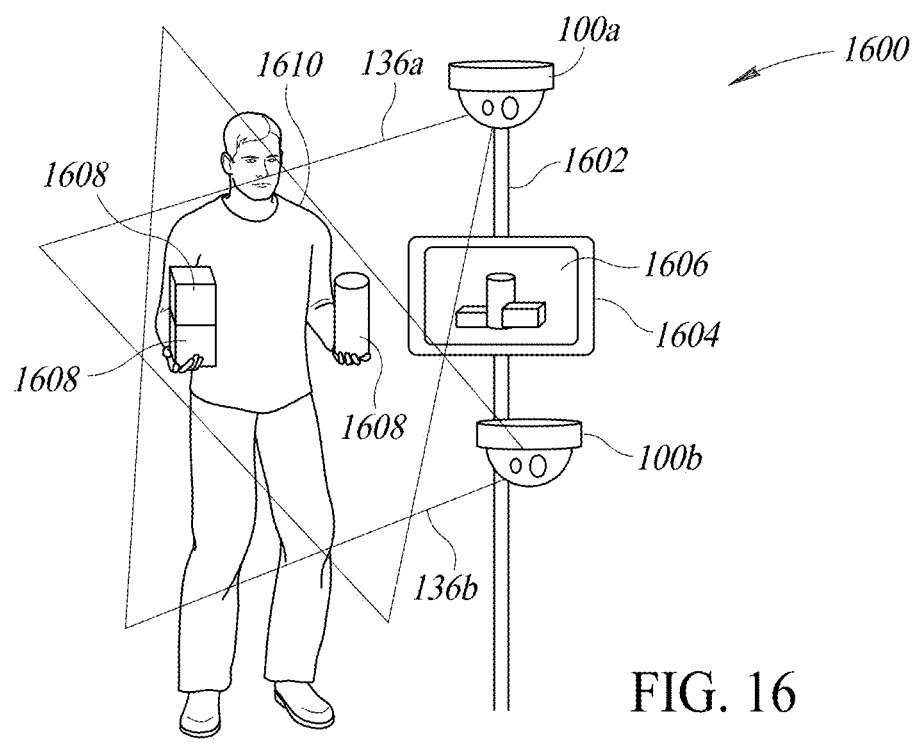
FIG. 16 is a pictorial view of an "in-hand" self-checkout system, according to one illustrated implementation.

FIG. 16 shows an example of an "in-hand" checkout system 1600. The system 1600 includes a frame 1602 (e.g., shaft) which supports an upper imaging system 100a, a lower imaging system 100b and a processor-based device 1604 that includes a user interface 1606 (e.g., display). The imaging systems 100a-b have respective fields of view 136a-b directed to detect objects 1608 carried by a customer 1610. The system 1600 may be useful in self-checkout operations where customers typically have a very small quantity of items carried in one or both hands. Example applications include stores in subway stations, train stations, airports, gas stations, or even sidewalk shops or coffee stands. This type of system improves convenience compared to vending machines or conventional self-checkout systems. Example types of items which may be purchased using the "in-hand" checkout system 1600 include gum, soft drinks, beer, chips, newspapers, magazines cigarettes, coffee, candy, etc. Further, the "in-hand" checkout system 1600 may be advantageous for customers that purchase items that are commonly bought together and which can be carried with one or two hands, such as a soft drink and chips, a sandwich and a soft drink, a newspaper and coffee, a donut and coffee, etc.

For the "in-hand" checkout system 1600 as well as at least some of the other systems disclosed herein, checkout and payment may be achieved at a high speed with minimal hassle. The imagers of the systems detect the objects and the customer's hands and body to know that the customer is present. Payment may be made by payment card (e.g., credit card, debit card) or by electronic payment such as a mobile-phone based payment (e.g., Apple Pay®, Google Wallet®). Additionally or alternatively, a wireless-based (e.g., RFID based) customer loyalty card may be used for customer identification. If the customer had a pre-paid account associated with a loyalty card, then payment may be automatically deducted from the customer's account.

The loyalty card or membership feature may be particularly useful for rapid checkout. For example, in such implementations, the customer need not remove a card from his or her pocket because a wireless transponder (e.g., RFID tag) may be read remotely by the self-checkout system. Customers may simply move past the checkout system at a relatively high speed, and the items they are purchasing may appear almost instantaneously on a display of a checkout system, along with the customer's identification information (e.g., name, identifier), as identified by the loyalty card (e.g., RFID loyalty card). In such implementations, walking past the checkout system may imply consent to pay, so the user may simply walk past the checkout system and exit the retail environment (e.g., grocery store) with his or her selected items. If there is a problem with the transaction, such as the total cost or items are incorrect, the customer may take action via a user interface of the checkout system and/or via a processor-based device (e.g., smartphone, tablet, laptop computer, desktop computer) operated by the customer.

Additionally or alternatively, Bluetooth® or other wireless protocol may be used to implement a similar rapid payment system.

Figure 17:
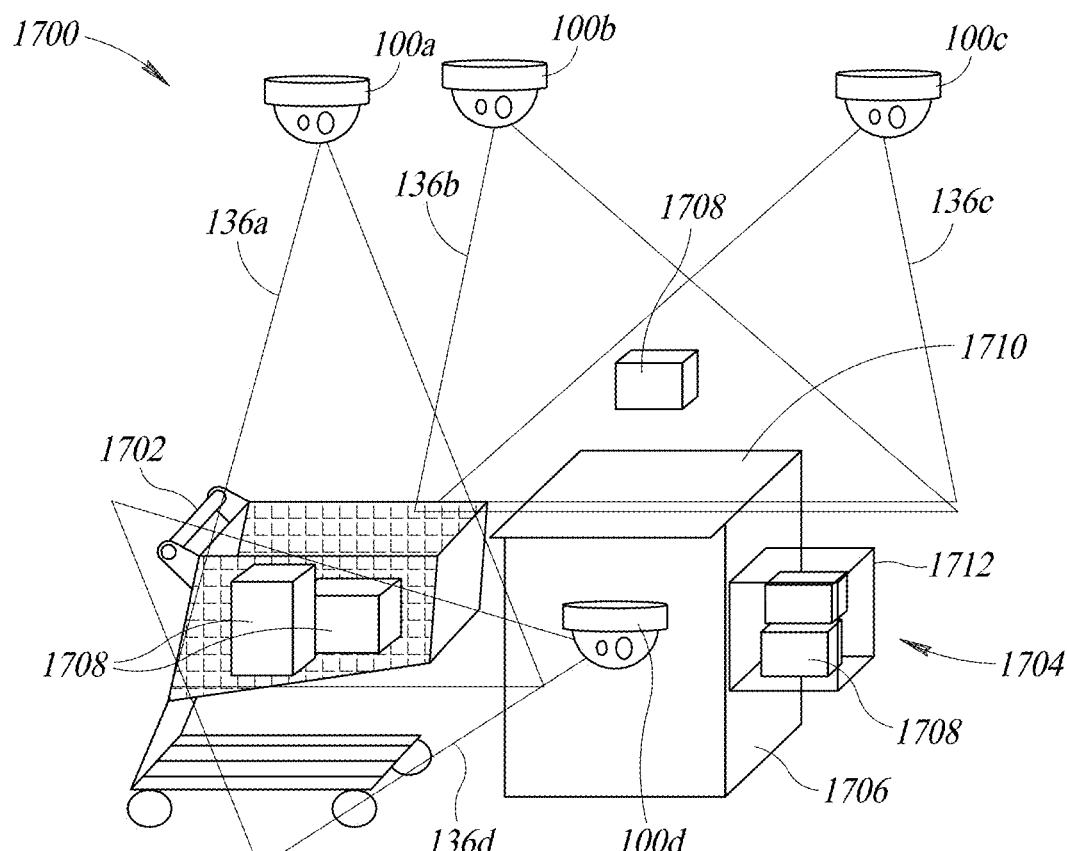
FIG. 17 is a pictorial view of a "direct-to-bag" self-checkout system, according to one illustrated implementation.

FIG. 17 show a "direct-to-bag" self-checkout system 1700, according to one implementation of the present disclosure. In this implementation, a number of imaging systems 100a-d are positioned so that their respective fields of view 136a-d provide a scanning volume proximate a checkout counter 1706 between a customer's shopping cart 1702 and a bagging area 1704. In the illustrated example, the checkout counter 1706 is provided which supports the imaging system 100d positioned at the front of the checkout counter. The customer may be instructed to move each of the objects 1708 proximate a top surface 1710 of the counter 1706 when moving the objects from the shopping cart 1720 to one or more bags 1712 in the bagging area 1704. During this movement, the imaging systems 100a-d collectively detect the objects 1708 using the methods discussed herein so that the objects may be added to a purchase or transaction list or otherwise input into a POS system to complete a transaction. It should be appreciated that there are many ergonomic designs that may be implemented to capture objects as they are transferred from a shopping cart to one or more bags.

Figure 18:
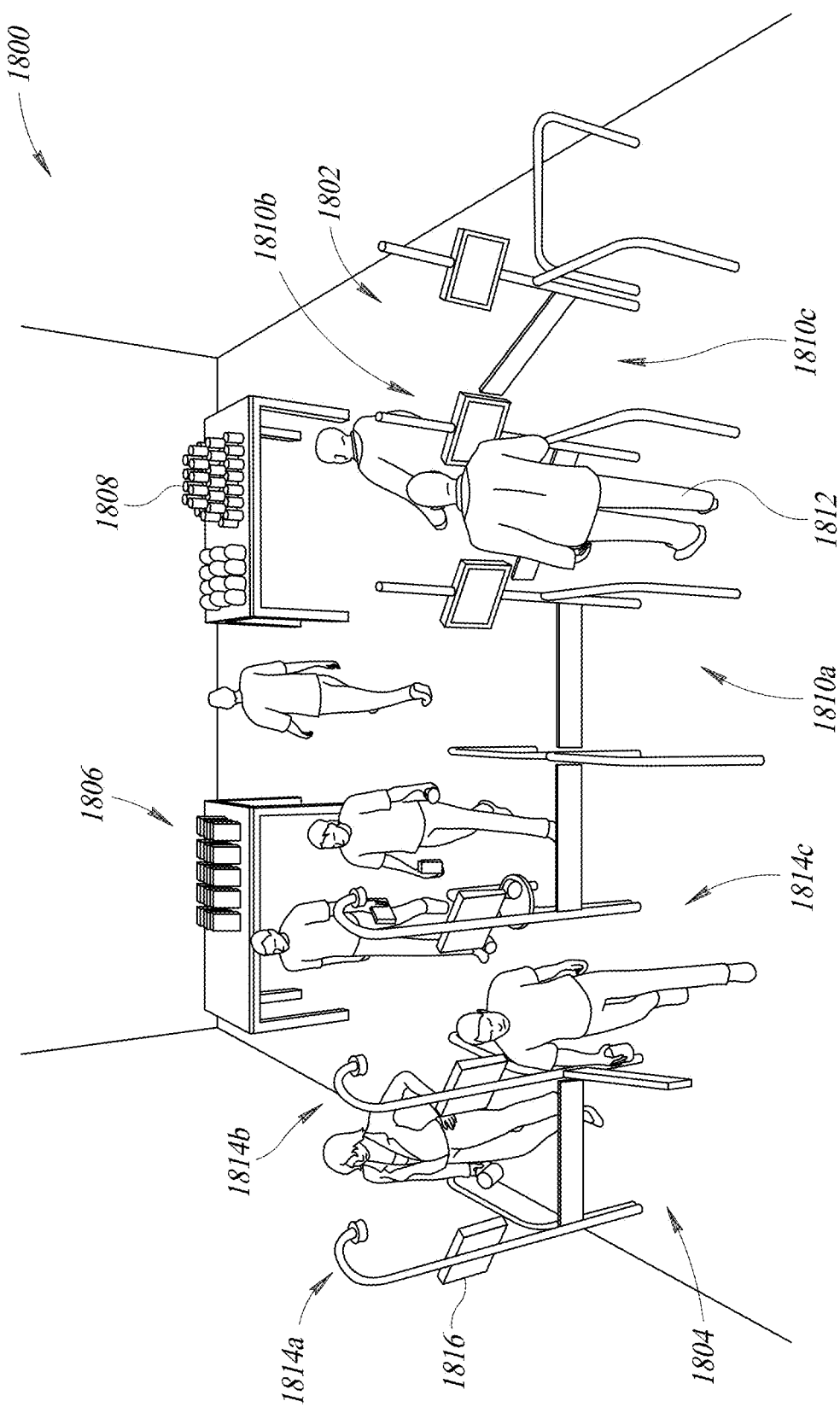
FIG. 18 is a pictorial view of a retail environment in the form of a controlled access store which may function without any operators, according to one illustrated implementation.

FIG. 18 shows an example retail environment in the form of a controlled access store 1800 which may function without any operators (e.g., checkout personnel). The store 1800 includes an entrance zone 1802, an exit zone 1804, and a shopping area 1806 which contains items 1808 available for purchase. The entrance zone 1802 includes a number of turnstile systems 1810a-c (collectively 1810) that may be opened by a customer 1812 by presenting determined access information. As an example, the customer 1812 may present an indication of a payment card (e.g., physical payment card, loyalty card) and/or may present a form of non-contact access information, such as by use of an RFID or other wireless payment protocol or authentication system. The non-contact access may be provided by a processor-based device (e.g., smartphone) of the customer, or by another device (e.g., physical card, RFID tag on a keychain). Such controlled access to the store 1800 ensures that only those who are authorized to pay are allowed access to the store. Further, at the entrance zone 1802 the customer typically has one or two free hands which allows the customer to operate equipment if necessary, such as tapping a smartphone to a reader.

After a customer has gained access to the store 1800, the customer may select and carry a small number of items toward the exit zone 1804 which includes a number of self-checkout systems 1814a-c. The self-checkout systems 1814a-c automatically identify the items 1808 carried by the customer, show the customer the prices on a display 1816, and debit the customer's account used to gain access to store 1800. If the customer simply walks past one of the self-checkout systems 1814, the customer is giving consent to pay for the items carried through the exit zone 1804. This essentially creates a human-scale vending machine.

In at least some implementations, RFID, Bluetooth®, or other wireless protocol may be used for communication between a customers' authentication and/or payment device (e.g., smartphone, card), the turnstile systems 1810 and the self-checkout systems 1814. In such implementations, the customer may be able to walk directly through a turnstile system 1810, which opens automatically via the wireless access information provided by the customer's authentication and/or payment device. The customer may then carry any number of items past one of the self-checkout systems 1814, whereby the self-checkout system automatically processes a transaction without requiring any interaction by the customer. This provides a convenient and fast shopping experience for the customer, while retaining full security against theft, and allows for a fully automated store which does not require operators to perform or assist with the checkout process.

FIG. 19 shows a more detailed view of the turnstile system 1810 of the store 1800 shown in FIG. 18. The turnstile system 1810 may include a frame 1900 which supports an access gate 1902 and a processor-based device 1904 which provides a user interface (e.g., display, touchscreen, keypad). As discussed above, the processor-based device 1904 may receive access information from the customer 1906, and may cause the access gate 1920 to open (or to be unlocked) to permit the customer to pass through the access gate into the store 1800 (FIG. 18). The customer 1906 may present a payment card or other type of access device (e.g., RFID card). Additionally or alternatively, the customer 1906 may utilize a processor-based device (e.g., smartphone) to wirelessly communicate with the processor-based device 1904 to gain access to the store 1800 via the access gate 1902.

FIG. 20A shows an enlarged view of the self-checkout systems 1814a-b of FIG. 18, and FIG. 20B shows an enlarged view of the self-checkout system 1814c. The self-checkout system 1814a-b of FIG. 20A includes a support frame 2000 which includes an upper portion 2002 that supports an imaging system 100. The imaging system 100 may be directed downward to provide a scanning volume in a path where a customer 2004 traverses carrying one or more objects 2006 when passing through the exit zone 1804 (FIG. 18) of the store 1800. The self-checkout system 1814a-b may optionally include a processor-based device 2008 which provides a user interface (e.g., display, touchscreen, speaker) for interaction with the customer 2004 to perform a checkout process. For example, the processor-based device 2008 may display images of objects, a transaction list, payment information, or other information used to implement a transaction. The self-checkout system 1814a-b may also optionally include an access gate 2010 which selectively opens after the customer 2004 has successfully paid for the items 2006 the customer is carrying.

The self-checkout system 1814c of FIG. 20B is similar to the self-checkout system 1814a-b of FIG. 20A in many respects, so only differences are discussed herein for the sake of brevity. The self-checkout system 1814c includes a shelf or platform 2012 on which the customer may place a few objects 2006 to be purchased, which may be advantageous for customers that wish to purchase more items than they can easily carry in their hands. The self-checkout system 1814c may also include additional imaging systems 100b-c (two shown) which are used to detect objects placed on the shelf 2012 by the customer 2004 during a checkout process. The imaging systems 100a-c collectively detect the objects 2006 in the customer's hands and/or on the shelf 2012, and automatically process a transaction as discussed above.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

U.S. Provisional Patent Application No. 62/440,923, filed Dec. 30, 2016 is incorporated herein by reference in its entirety.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A self-checkout system, comprising: a scanning imager having a scanning imager field of view to capture images of an environment; a targeting imager having a targeting imager field of view to capture images of the environment, the targeting imager comprising a three dimensional imager, the scanning imager field of view extending outward from the scanning imager at a first angle and the targeting imager field of view extending outward from the targeting imager at a second angle, the first angle less than the second angle; a steering component selectively which in operation selectively steers the scanning imager field of view relative to one or more objects in the environment within the targeting imager field of view; at least one nontransitory processor-readable storage medium that stores at least one of processor-executable instructions or data; and at least one processor communicably coupled to the at least one nontransitory processor-readable storage medium, the scanning imager, the targeting imager and the steering component, in operation the at least one processor: receives a plurality of targeting images from the targeting imager; processes the received plurality of targeting images to locate at least one object present in the environment; generates an object model for the at least one object, the object model specifying at least one of a presence, a position, a speed or a direction of the at least one object in the environment to at least partially track the at least one object in the environment; for each object model, generates a future projection model for the object model based at least in part on a position of the object and a velocity of the object; generates a scan pattern for the scanning imager to capture scanning images of the at least one object based on the generated future projection model; causes the steering component to steer the scanning imager field of view based at least in part on the generated object model and generated scan pattern; causes the scanning imager to capture at least one scanning image of the at least one object in the environment; and processes the at least one scanning image to identify the at least one object in the environment as belonging to a defined type of object.

2. The self-checkout system of claim 1 wherein the at least one processor: logically associates the at least one object identified as belonging to a defined type of object with a transaction in the at least one nontransitory processor-readable storage medium.

3. The self-checkout system of claim 1 wherein the at least one processor: converts each of the plurality of targeting images received from the targeting image into a depth map.

4. The self-checkout system of claim 1 wherein the at least one processor: compares a new object model with a list of existing object models, the list of existing object models indicative of objects that are currently present in the targeting imager field of view; responsive to a determination that the new object model matches an existing object model, updates the matched existing object model with information associated with the new object model; and responsive to a determination that the new object model does not match an existing object model, inserts the new object model into the list of existing object models.

5. The self-checkout system of claim 1 wherein the at least one processor: applies at least one constraint to generate the scan pattern, the at least one constraint includes at least one of: an object entry constraint, an object exit constraint, a scanning imager field of view overlap constraint, and an object surface skew limit constraint.

6. The self-checkout system of claim 1 wherein the at least one processor: for each object model, determines a scanning schedule to implement the generated scan pattern for the scanning imager; and controls the steering component and the scanning imager to cause the scanning imager to capture a plurality of scanning images according to the generated scanning schedule.

7. The self-checkout system of claim 1 wherein the at least one processor: processes at least one targeting image to determine skew information for a surface of an object; and processes at least one scanning image to correct for skew based at least in part on the determined skew information.

8. The self-checkout system of claim 1 wherein the at least one processor: receives a plurality of scanning images captured by the scanning imager, each of the plurality of scanning images at least partially overlaps with at least one other scanning image in the plurality of scanning images; processes the plurality of scanning images to correct for skew; registers the plurality of images to generate a composite image; and processes the composite image to identify the at least one object in the environment as belonging to a defined type of object.

9. A method of operation for a self-checkout system, the method comprising: receives, by at least one processor, a plurality of targeting images from a targeting imager having a targeting imager field of view directed toward an environment; processing, by the at least one processor, the received targeting images to locate at least one object present in the environment; generating, by the at least one processor, an object model for the at least one object, the object model specifying at least one of a presence, a position, a speed or a direction of the at least one object in the environment to at least partially track the at least one object in the environment; generating a future projection model for the object model, the future projection model based at least in part on a position of the at least one object and a velocity of the at least one object; generating a scan pattern for the scanning imager to capture scanning images of the at least one object based on the generated future projection model; causing, by the at least one processor, a steering component to steer a scanning imager field of view of a scanning imager based at least in part on the generated object model and generated scan pattern; causing, by the at least one processor, the scanning imager to capture at least one scanning image of the at least one object in the environment; and processing, by the at least one processor, the at least one scanning image to identify the at least one object in the environment as belonging to a defined type of object.

10. A self-checkout system, comprising: a scanning imager having a scanning imager field of view to capture images of an environment; a variable focus lens positioned in an optical path between the scanning imager and the environment; a targeting imager having a targeting imager field of view to capture images of the environment, the targeting imager comprising a three dimensional imager, the scanning imager field of view extending outward from the scanning imager at a first angle and the targeting imager field of view extending outward from the targeting imager at a second angle, the first angle less than the second angle; a steering component which in operation selectively steers at least a portion of the scanning imager field of view relative to one or more objects in the environment within the targeting imager field of view; at least one nontransitory processor-readable storage medium that stores at least one of processor-executable instructions or data; and at least one processor communicably coupled to the at least one nontransitory processor-readable storage medium, the scanning imager, the targeting imager and the steering component, in operation the at least one processor: causes the targeting imager to capture at least one targeting image of at least one object in the environment; generates object information from the at least one targeting image indicative of at least one of a presence, a position, a speed or a direction of the at least one object in the environment to at least partially track the at least one object in the environment; generates a future projection of object information from the generated object information based at least in part on a position of the object and a speed of the object; generates a scan pattern for the scanning imager to capture scanning images of the at least one object based at least in part on the generated future projection object information; causes the steering component to steer the scanning imager field of view based at least in part on the scan pattern; causes the variable focus lens to adjust a focus based at least in part on the object information; causes the scanning imager to capture at least one scanning image of the at least one object in the environment; processes the at least one scanning image to identity the at least one object in the environment as belonging to a defined type of object; and logically associates the at least one object identified as belonging to a defined type of object with a transaction in the at least one nontransitory processor-readable storage medium.

11. The self-checkout system of claim 10 wherein the at least one processor: causes the variable focus lens to adjust a focus based at least in part on the object information prior to completion of the steering component steering the scanning imager field of view based at least in part on the object information.

12. The self-checkout system of claim 10 wherein the at least one processor: processes the at least one targeting image to determine at least one dimension of the at least one object identified in the environment.

13. The self-checkout system of claim 10 wherein the at least one processor: processes the at least one targeting image to determine a quantity of objects in the environment.

14. The self-checkout system of claim 10, wherein the object information comprises object distance information for the at least one object in the environment.

15. The self-checkout system of claim 10 wherein the steering component comprises a fast steering mirror, the scanning imager comprises a global shutter machine-readable symbol reader, and the targeting imager comprises one of a stereo camera or a time-of-flight camera.

16. The self-checkout system of claim 10 wherein the at least one processor: processes the at least one scanning image to detect at least one machine-readable symbol.

17. The self-checkout system of claim 10 wherein the at least one processor processes the at least one scanning image to at least one of: decode at least one machine-readable symbol, recognize at least one visual pattern, recognize at least one three dimensional object, track movement of at least one three dimensional object, or recognize at least one human action.

18. The self-checkout system of claim 10 wherein the at least one processor: processes the at least one targeting image to detect at least one surface of the at least one object; and compares the detected at least one surface to a dataset to identify the at least one object in the environment as belonging to the defined type of object.

19. The self-checkout system of claim 10 wherein the object information includes at least one size dimension of the at least one object.

20. The self-checkout system of claim 2 wherein the at least one processor: segments a plurality objects depicted in the at least one targeting image.

21. The self-checkout system of claim 10 wherein the at least one processor: receives payment information associated with a user; and processes a payment for the transaction using the received payment information.

22. The self-checkout system of claim 10 wherein the generated object information comprises object models that each correspond to objects detected in the environment.

23. The self-checkout system of claim 22 wherein the at least one processor: compares a new object model to an existing object model to track the at least one object in the environment.

24. A method of operation for a sell-checkout system, the method comprising: causing, by at least one processor, a targeting imager to capture at least one targeting image of at least one object in an environment, the targeting imager comprising a three dimensional imager; generating, by the at least one processor, object information from the at least one targeting image indicative of at least one of a presence, a position, a speed or a direction of the at least one object in the environment to at least partially track the at least one object in the environment; generating a future projection of object information from the generated object information based at least in part on a position of the object and a speed of the object; generating a scan pattern for the scanning imager to capture scanning images of the at least one object based at least in part on the generated future projection object information; causing, by the at least one processor, a steering component to steer a scanning imager field of view of the scanning imager based at least in part on the scan pattern; causing, by the at least one processor, a variable focus lens to adjust a focus of the scanning imager based at least in part on the object information; causing, by the at least one processor, the scanning imager to capture at least one scanning image of the at least one object in the environment; processing, by the at least one processor, the at least one scanning image to identify the at least one object in the environment as belonging to a defined type of object; and logically associating, by the at least one processor, the at least one object identified as belonging to a defined type of object with a transaction in the at least one nontransitory processor-readable storage medium.

* * * * *

UNITED STATES PATENT AND TRADEMARK OFFICE
CERTIFICATE OF CORRECTION

PATENT NO. : 10,825,010 B2  
APPLICATION NO. : 15/848436  
DATED : November 3, 2020  
INVENTOR(S) : Bryan Olmstead et al.

Page 1 of 1

It is certified that error appears in the above-identified patent and that said Letters Patent is hereby corrected as shown below:

In the Claims

Column 20, Line 59, Claim 10:
"scanning image to identity"
Should read:
--scanning image to identify--.

Column 22, Line 11, Claim 24:
"A method of operation for a sell-checkout system"
Should read:
--A method of operation for a self-checkout system--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*